(12) United States Patent
Li

(10) Patent No.: US 12,418,685 B2
(45) Date of Patent: *Sep. 16, 2025

(54) TECHNIQUES FOR LIMITING THE INFLUENCE OF IMAGE ENHANCEMENT OPERATIONS ON PERCEPTUAL VIDEO QUALITY ESTIMATIONS

(71) Applicant: NETFLIX, INC., Los Gatos, CA (US)

(72) Inventor: Zhi Li, Mountain View, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/549,793

(22) Filed: Dec. 13, 2021

(65) Prior Publication Data

US 2022/0103869 A1 Mar. 31, 2022

Related U.S. Application Data

(63) Continuation of application No. 17/157,871, filed on Jan. 25, 2021, now Pat. No. 11,202,103.

(Continued)

(51) Int. Cl.
*H04N 19/86* (2014.01)
(52) U.S. Cl.
CPC .................... *H04N 19/86* (2014.11)
(58) Field of Classification Search
CPC ...................................... H04N 19/86

(Continued)

(56) References Cited

U.S. PATENT DOCUMENTS 7,526,142 B2 4/2009 Sheraizin et al.
10,255,667 B2 4/2019 He et al.
(Continued)

FOREIGN PATENT DOCUMENTS

WO 2020043279 A1 3/2020

OTHER PUBLICATIONS

Moldonvan et al., "A Novel Mechanism for Mapping Objective Video Quality Metrics to Subjective MOS Scale", DOI:10.1109/BMSB.2014.6873572, Conference: 2014 IEEE International Symposium on Broadband Multimedia Systems and Broadcasting (BMSB), 19 pages.

(Continued)

*Primary Examiner* — Amir Shahnami
(74) *Attorney, Agent, or Firm* — Artegis Law Group, LLP

(57) ABSTRACT

In various embodiments, a tunable VMAF application reduces an amount of influence that image enhancement operations have on perceptual video quality estimates. In operation, the tunable VMAF application computes a first value for a first visual quality metric based on reconstructed video content and a first enhancement gain limit. The tunable VMAF application computes a second value for a second visual quality metric based on the reconstructed video content and a second enhancement gain limit. Subsequently, the tunable VMAF application generates a feature value vector based on the first value for the first visual quality metric and the second value for the second visual quality metric. The tunable VMAF application executes a VMAF model based on the feature value vector to generate a tuned VMAF score that accounts, at least in part, for at least one image enhancement operation used to generate the reconstructed video content.

27 Claims, 5 Drawing Sheets

Related U.S. Application Data

(60) Provisional application No. 63/117,931, filed on Nov. 24, 2020, provisional application No. 63/052,423, filed on Jul. 15, 2020.

(58) Field of Classification Search
USPC .................................................. 375/240.29
See application file for complete search history.

(56) References Cited

U.S. PATENT DOCUMENTS

| | | | |
|---|---|---|---|
| 10,475,172 | B2 | 11/2019 | Aaron et al. |
| 10,715,814 | B2 | 7/2020 | Katsavounidis |
| 11,089,359 | B1 | 8/2021 | Katsavounidis |
| 2011/0282194 | A1* | 11/2011 | Reiner .................. G16H 50/70 600/431 |
| 2016/0021380 | A1 | 1/2016 | Li et al. |
| 2016/0227220 | A1* | 8/2016 | Tanchenko ........... H04N 19/103 |
| 2016/0317127 | A1* | 11/2016 | dos Santos Mendonca ................ G16Z 99/00 |
| 2016/0335754 | A1* | 11/2016 | Aaron ................. H04N 21/4666 |
| 2017/0132785 | A1* | 5/2017 | Wshah .................. G06T 7/0012 |
| 2018/0144214 | A1* | 5/2018 | Hsieh .................... G06T 7/0002 |
| 2019/0246112 | A1 | 8/2019 | Li et al. |
| 2019/0289296 | A1 | 9/2019 | Kottke et al. |
| 2019/0373293 | A1 | 12/2019 | Bortman et al. |
| 2020/0021865 | A1* | 1/2020 | Topiwala ................. G06N 3/08 |
| 2020/0145661 | A1 | 5/2020 | Jeon et al. |
| 2020/0296362 | A1 | 9/2020 | Chadwick et al. |
| 2021/0385502 | A1* | 12/2021 | Dinh ...................... H04N 19/46 |

OTHER PUBLICATIONS

Bampis et al., "Enhancing Temporal Quality Measurements in a Globally Deployed Streaming Video Quality Predictor," 2018 25th IEEE International Conference on Imaging Processing (ICIP), Athens, Greece, 2018, pp. 614-618, doi: 10.1109/ICIP.2018.8451275, 5 pages.

Li et al., "Image Quality Assesment by Separately Evaluating Detail Losses and Additive Impairments," in IEEE Transactions on Multimedia, vol. 13, No. 5, pp. 935-949, Oct. 2011, doi: 10.1109/TMM.2011.2152382., 15 pages.

Yang et al., "Perceptual Quality Assesment of Screen Content Images," in IEEE Transactions on Image Processing, vol. 24, No. 11, pp. 4408-4421, Nov. 2015, doi: 10.1109/TIP.2015.2465145, 14 pages.

* cited by examiner

TECHNIQUES FOR LIMITING THE INFLUENCE OF IMAGE ENHANCEMENT OPERATIONS ON PERCEPTUAL VIDEO QUALITY ESTIMATIONS

CROSS-REFERENCE TO RELATED APPLICATIONS

This application is a continuation of the co-pending U.S. patent application titled, "TECHNIQUES FOR LIMITING THE INFLUENCE OF IMAGE ENHANCEMENT OPERATIONS ON PERCEPTUAL VIDEO QUALITY ESTIMATIONS", filed on Jan. 25, 2021 and having Ser. No. 17/157,871, which claims the priority benefit of United States provisional patent application titled, "TECHNIQUES FOR IMPROVING VMAF", filed Nov. 24, 2020, and having Ser. No. 63/117,931, and also claims the priority benefit of United States provisional patent application titled, "TECHNIQUES FOR ASSESSING THE IMPACT OF IMAGE ENHANCEMENT OPERATIONS ON VMAF", filed Jul. 15, 2020 and having Ser. No. 63/052,423. The subject matter of these related applications is hereby incorporated herein by reference.

BACKGROUND

Field of the Various Embodiments

The various embodiments relate generally to computer science and to video and video encoding technology and, more specifically, to techniques for limiting the influence of image enhancement operations on perceptual video quality estimations.

Description of the Related Art

Efficiently and accurately encoding video data is critical for real-time streaming of high-quality videos. Typically, after an encoded version of a video is streamed to a playback device, the encoded video data is decoded to generate a reconstructed video that is then played back on the playback device. To increase the degree of compression and, accordingly, reduce the size of encoded videos, encoders typically execute lossy data compression algorithms to eliminate certain selected information. As a general matter, eliminating information during the encoding process can cause visual impairments or "distortions" that reduce the overall visual quality of a reconstructed video derived from an encoded video.

Because the number and types of distortions introduced during the encoding process can vary, quality controls are typically implemented to ensure that the visual quality of the reconstructed videos, as perceived by actual viewers (referred to herein as "perceptual video quality"), is acceptable. However, manually verifying the perceptual video quality of reconstructed videos can be prohibitively time consuming and expensive. Therefore, some form of automated perceptual video quality assessment is oftentimes integrated into the video encoding and transmission process. For example, automated perceptual video quality assessment could be employed when determining which encoded version of a given video should be transmitted to a playback device to provide an optimized level of overall visual quality during playback while reducing or avoiding playback interruptions due to re-buffering. In another example, automated perceptual video quality assessment could be employed during coder/decoder ("codec") evaluation to estimate the numbers of bits used by different data compression algorithms to achieve various perceptual video quality levels.

In one approach to automatically assessing perceptual video quality, a software application computes visual quality scores for multiple visual quality metrics based on a reconstructed video and an associated original source video. The software application assembles the visual quality scores into a feature value vector. The software application then maps the feature value vector to a Video Multi-Method Assessment Fusion "VMAF" score that estimates the perceptual video quality of the reconstructed video using a VMAF model that is trained using human-observed visual quality scores for reconstructed training videos. Each human-observed visual quality score reflects the visual quality of a discrete portion of reconstructed training video content as perceived by a human viewer when viewing the portion of the reconstructed training video content.

One drawback of the above approach is that the impact of data compression operations on perceptual video quality can be difficult to assess based on VMAF scores when image enhancement operations are applied within a codec. Some examples of image enhancement operations include, without limitation, sharpening operations, contrasting operations, and histogram equalization operations. In this regard, when image enhancement operations are applied within a codec, the VMAF score of a reconstructed video generated via that codec typically includes an estimated gain that is attributable to the image enhancement operations (referred to herein as an "enhancement gain"). Because the VMAF score is a single integer, and the enhancement gain is usually unknown, the enhancement gain obscures the impact that the data compression operations implemented by the codec have on the perceptual video quality of the resulting reconstructed video. In situations where separating image enhancement operations from a codec is not feasible, using VMAF scores to evaluate different codecs can result in the enhancement gain being erroneously attributed to the data compression operations implemented by the codecs, which makes such evaluations difficult, if not impossible.

As the foregoing illustrates, what is needed in the art are more effective techniques for reducing the influence of image enhancement operations on perceptual video quality estimations.

SUMMARY

One embodiment sets forth a method reducing an amount of influence that image enhancement operations have on perceptual video quality estimates. The method includes computing a first value for a first visual quality metric based on first reconstructed video content and a first enhancement gain limit, where at least one image enhancement operation is used to generate the first reconstructed video content; computing a second value for a second visual quality metric based on the first reconstructed video content and a second enhancement gain limit; generating a first feature value vector based on the first value for the first visual quality metric and the second value for the second visual quality metric; and executing a Video Multi-Method Assessment Fusion ("VMAF") model based on the first feature value vector to generate a first tuned VMAF score that accounts, at least in part, for the at least one image enhancement operation.

At least one technical advantage of the disclosed techniques relative to the prior art is that the disclosed techniques can be used to reduce the influence of image enhancement operations on perceptual video quality estimations for reconstructed videos. Thus, the disclosed techniques enable the impact of data compression operations on perceptual video quality to be more accurately quantified. In this regard, the disclosed techniques can be applied to reduce the enhancement gains included in feature values on which a given VMAF model is based, which, in turn, reduces the enhancement gains reflected in the perceptual video quality levels estimated by that VMAF model. Thus, with the disclosed techniques, the perceptual video quality levels generated using VMAF models can more accurately reflect the impact of codec data compression operations on perceptual video quality levels. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
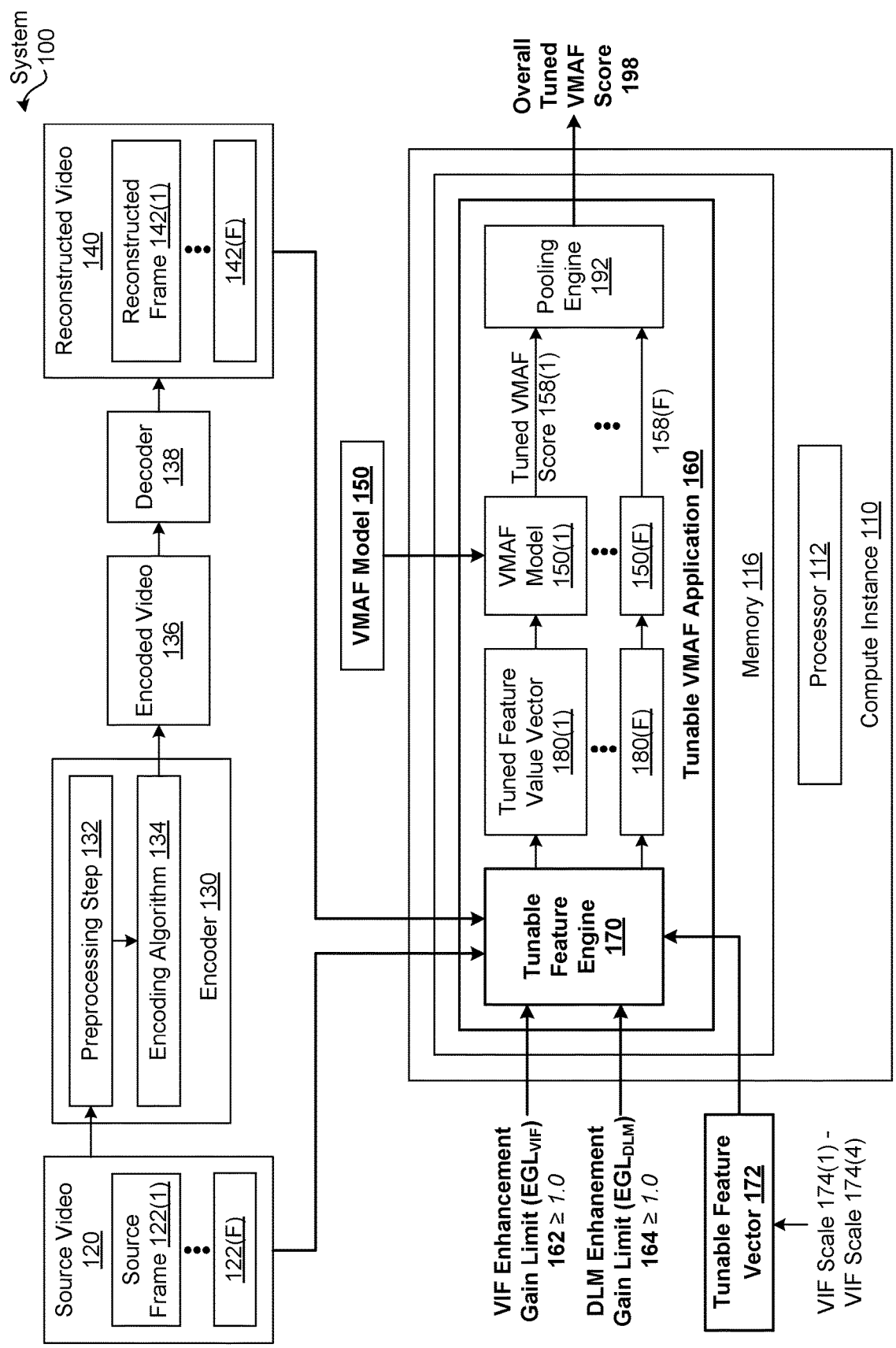
FIG. 1 is a conceptual illustration of a system configured to implement one or more aspects of the various embodiments.

In the following description, numerous specific details are set forth to provide a more thorough understanding of the various embodiments. However, it will be apparent to one skilled in the art that the inventive concepts may be practiced without one or more of these specific details.

A typical video streaming service provides access to a library of videos that can be viewed on a range of different playback devices, where each playback device usually connects to the video streaming service under different connection and network conditions. To enable a given video to be efficiently delivered to playback devices, the video streaming service pre-generates multiple different encoded videos based on the video. Typically, after an encoded version of the video is streamed to a playback device, the encoded video data is decoded to generate a reconstructed video that is then played back on the playback device.

To increase the degree of compression and, accordingly, reduce the size of encoded videos, encoders typically execute lossy data compression algorithms to eliminate certain selected information. As a general matter, eliminating information during the encoding process can cause distortions that reduce the overall visual quality of a reconstructed video derived from an encoded video. And because the number and types of distortions introduced during the encoding process can vary, the impact of the encoding process on the visual quality of reconstructed videos as perceived by actual viewers (referred to herein as "perceptual video quality") can vary.

To properly optimize tradeoffs between sizes of encoded videos and the perceptual video quality levels of corresponding reconstructed videos, some form of automated perceptual video quality assessment is oftentimes integrated into the video encoding and transmission process. For example, automated perceptual video quality assessment could be employed when determining which encoded version of a given video should be transmitted to a playback device to provide an optimized level of overall visual quality during playback while reducing or avoiding playback interruptions due to re-buffering. In another example, automated perceptual video quality assessment could be employed during coder/decoder ("codec") evaluation to estimate the numbers of bits used by different data compression algorithms to achieve various perceptual video quality levels.

In one approach to automatically assessing perceptual video quality, a software application computes feature values for features of a VMAF model based on a reconstructed video and an original source video. Each of the features is a metric that is relevant to perceptual video quality, and each of the feature values is a value or "score" for the corresponding metric. The VMAF model is trained to map feature values for a given portion (including all) of a given reconstructed video to a value for a VMAF metric for the portion of the reconstructed video using human-observed visual quality scores for portions of reconstructed training videos. Each human-observed visual quality score reflects the visual quality of a discrete portion of reconstructed training video content as perceived by a human viewer when viewing the portion of the reconstructed training video content. The VMAF score for a given portion of a given reconstructed video estimates the perceptual video quality of the portion of the reconstructed video.

In one example, the features of the VMAF model are a VIF quality index at four different spatial scales, a DLM metric, and a temporal information ("TI") metric. The VIF quality index captures visual information fidelity loss at an associated spatial scale, the DLM captures loss of details, and the TI quality metric captures temporal distortions associated with and/or causing motion. In operation, the software application computes feature values for each reconstructed frame of the reconstructed video. For each reconstructed frame, the software application executes the VMAF model based on the corresponding feature values to generate a VMAF score that estimates the perceptual video quality of the reconstructed frame. The software application then computes the arithmetic mean of the VMAF scores of the reconstructed frames to generate the overall VMAF score for the reconstructed video.

One drawback of the above approach is that the impact of data compression operations on perceptual video quality can be difficult to assess based on VMAF scores when separating image enhancement operations that are applied within a codec from the codec is not feasible. An example of a situation where separating image enhancement operations from a codec may not be feasible is when a proprietary codec integrates image enhancement operations into a preprocessing step of the encoder and/or a postprocessing step of the decoder. In this regard, when image enhancement operations are applied within a codec, the overall VMAF score of a reconstructed video generated via that codec typically includes a corresponding enhancement gain. As a result, using VMAF scores to evaluate different codecs can result in the enhancement gain being erroneously attributed to the data compression operations implemented by the codecs, which makes such evaluations difficult, if not impossible.

Another drawback of the above approach is that empirical results have shown that certain types of image enhancement operations can be overused. When image enhancement operations are overused, the visual quality of a reconstructed video as perceived by actual viewers can be less than visual quality levels estimated via many commonly used visual quality metrics, including the VIF quality index, the DLM, and the VMAF metric.

With the disclosed techniques, however, a tunable VMAF application can be configured to limit or disable the influence of image enhancement operations on estimates of perceptual video quality levels for reconstructed videos. In some embodiments, the tunable VMAF application computes an overall tuned VMAF score for a reconstructed video based on the reconstructed video, the corresponding original source video, the VMAF model described above, a VIF enhancement gain limit, and a DLM enhancement gain limit. The VIF enhancement gain limit is a configurable parameter that limits the enhancement gain measurable by a tunable VIF extractor that institutes a tunable VIF quality index derived from the VIF quality index. The DLM enhancement gain limit is a configurable parameter that limits the enhancement gain measurable by a tunable DLM extractor that institutes a tunable DLM derived from the DLM.

For each reconstructed frame of the reconstructed video, the tunable VMAF application configures the tunable VIF extractor to computes four tuned VIF quality scores for the tuned VIF quality index at the four spatial scales associated with the four VIF features of the VMAF model. The tunable VIF extractor institutes a modified version of a pixel-domain implementation of the VIF quality index in which the gain for each pixel is limited to a maximum of the VIF enhancement gain limit. The VIF enhancement gain limit can be any number greater than or equal to one. If the VIF enhancement gain limit is one, then the influence of image enhancement operations on tuned VIF scores is disabled. As the VIF enhancement gain limit increases, the maximum amount of influence that image enhancement operations can have on tuned VIF scores increases.

For each reconstructed frame of the reconstructed video, the tunable VMAF application configures the tunable DLM extractor to compute a tuned DLM score. The tunable DLM extractor institutes a modified version of a wavelet-domain implementation of the DLM in which an absolute value of each restored wavelet coefficient for which contrast enhancement is detected is limited based on the DLM enhancement gain limit. The restored wavelet coefficients correspond to a restored image that includes the same detail loses as the reconstructed frame but does not include any additive impairments. A detail loss is a loss of visual information, while an additive impairment is redundant visual information that can be distracting to viewers. The DLM enhancement gain limit can be any number greater than or equal to one. If the DLM enhancement gain limit is one, then the influence of image enhancement operations on tuned DLM scores is disabled. As the DLM enhancement gain limit increases, the maximum amount of influence that image enhancement operations can have on tuned DLM scores increases.

The tunable VMAF application computes a TI score for each reconstructed frame based on differences between the reconstructed frame and an adjacent reconstructed frame. For each reconstructed frame, the tunable VMAF application sets the feature values for the four VIF features equal to the four tuned VIF scores for the reconstructed frame, the feature value for the DLM feature equal to the tuned DLM score for the reconstructed frame, and the feature value for the TI feature equal to the TI score for the reconstructed frame. For each reconstructed frame, the tunable VMAF application executes the VMAF model based on the corresponding feature values to generate a tuned VMAF score. Notably, the enhancement gain included in the tuned VMAF score is indirectly limited as per the VIF enhancement gain limit and the DLM enhancement gain limit. The tunable VMAF application then computes the arithmetic mean of the tuned VMAF scores of the reconstructed frames to generate an overall tuned VMAF score for the reconstructed video. The overall tuned VMAF score estimates the perceptual video quality of the reconstructed video subject to the VIF enhancement gain limit and the DLM enhancement gain limit.

At least one technical advantage of the disclosed techniques relative to the prior art is that the disclosed techniques can be used to reduce the influence of image enhancement operations on perceptual video quality estimations for reconstructed videos. More specifically, the VIF enhancement gain and the DLM enhancement gain control the amount of influence that image enhancement operations can have on the overall tuned VMAF score. In particular, setting both the VIF enhancement gain and the DLM enhancement gain equal to one can disable the influence of image enhancement operations on the tuned VIF scores, the tuned DLM scores, and the tuned VMAF scores. As a result, relative to VMAF scores that are influenced by image enhancement operations, tuned VMAF scores can enable the impact of data compression operations on perceptual video quality to be more accurately quantified. Thus, tuned VMAF scores can more accurately reflect the impact of codec data compression operations on perceptual video quality levels relative to VMAF scores. Another advantage of the disclosed techniques is that the VIF enhancement gain limit and the DLM enhancement gain limit can be set to values that decrease the likelihood that overall tuned VMAF scores overestimate the perceptual video quality of reconstructed videos when image enhancement operations are overused. These technical advantages provide one or more technological improvements over prior art approaches.

System Overview

FIG. 1 is a conceptual illustration of a system 100 configured to implement one or more aspects of the various embodiments. For explanatory purposes, multiple instances of like objects are denoted with reference numbers identifying the object and parenthetical alphanumeric character(s) and/or numerical superscripts identifying the instance where needed. As shown, in some embodiments, the system 100 includes, without limitation, a source video 120, an encoder 130, an encoded video 136, a decoder 138, a reconstructed video 140, a compute instance 110, and a VMAF model 150.

In some other embodiments, the system 100 can omit the encoder 130 and/or the decoder 138. In the same or other embodiments, the system 100 can include, without limitation, multiple instances of any number of the source video 120, the encoder 130, the encoded video 136, the decoder 138, the reconstructed video 140, the compute instance 110, and the VMAF model 150 in any combination. For explanatory purposes only, multiple instances of source video 120, the encoder 130, the encoded video 136, the decoder 138, the reconstructed video 140, the compute instance 110, and the VMAF model 150 are referred to herein as "the source videos 120," "the encoders 130," "the encoded videos 136," "the decoders 138," "the reconstructed videos 140," "the compute instances 110," and "the VMAF models 150," respectively.

The components of the system 100 can be distributed across any number of shared geographic locations and/or any number of different geographic locations and/or implemented in one or more cloud computing environments (i.e. encapsulated shared resources, software, data, etc.) in any combination. In some embodiments, each compute instance 110 can be implemented in a cloud computing environment, implemented as part of any other distributed computing environment, or implemented in a stand-alone fashion.

The source video 120 includes, without limitation, any amount and/or types of video content. Some examples of video content include, without limitation, any portion (including all) of feature length films, episodes of television programs, and music videos, to name a few. As shown, the source video 120 includes, without limitation, source frames 122(1)-122(F), where F can be any positive integer. The source frames 122(1)-122(F) are also referred to herein individually as "the source frame 122" and collectively as "the source frames 122." Each of the source frames 122 includes, without limitation, any amount and/or type of image content.

As shown, in some embodiments, the encoder 130 generates the encoded video 136 based on the source video 120. The encoded video 136 includes, without limitation, encoded video content that is derived from the video content included in the source video 120. The encoder 130 can generate the encoded video 136 in any technically feasible fashion. As shown, in some embodiments, the encoder 130 includes, without limitation, a preprocessing step 132 and an encoding algorithm 134.

During the preprocessing step 132, the encoder 130 can execute any number and/or types of operations on the source video 120. In some embodiments, the encoder 130 executes one or more image enhancement operations during the preprocessing step 132. Some examples of image enhancement operations include, without limitation, sharpening operations, contrasting operations, and histogram equalization operations. The encoding algorithm 134 can execute, without limitation, any number and/or types of lossy data compression operations and/or encoding operations to generate the encoded video 136. In some embodiments, separating the preprocessing step 132 and the encoding algorithm 134 can be difficult if not impossible in the context of the system 100. For instance, in some embodiments, the encoder 130 is a proprietary encoder, and the owner of the encoder 130 differs from the owner of the system 100.

As shown, in some embodiments, the decoder 138 generates the reconstructed video 140 based on the encoded video 136. The reconstructed video 140 is an approximate reconstruction of the source video 120 and includes, without limitation, any amount and/or types of reconstructed video content that is consistent with the source video content included in the source video 120. As shown, the reconstructed video 140 includes, without limitation, reconstructed frames 142(1)-142(F) that are approximate reconstructions of the source frames 122(1)-122(F), respectively. The reconstructed frames 142(1)-142(F) are also referred to herein individually as "the reconstructed frame 142" and collectively as "the reconstructed frames 142." The reconstructed frames 142(1)-142(F) are approximate reconstructions of the source frames 122(1)-122(F), respectively. Each of the reconstructed frames 142 includes, without limitation, any amount and/or type of reconstructed image content.

The decoder 138 can derive the reconstructed video 140 from the encoded video 136 in any technically feasible fashion. In some embodiments, the decoder 138 includes, without limitation, a decoding algorithm (not shown) that approximately reverses the encoding algorithm 134 to generate a decoded video based on the encoded video 136. The decoding algorithm can execute, without limitation, any number and/or types of decoding operations and/or data decompression operations. In some embodiments, the decoded video is the reconstructed video 140.

In some other embodiments, the decoder 138 executes a postprocessing step on the decoded video to generate the reconstructed video 140. During the postprocessing step, the decoder 138 can execute, without limitation, any number of image enhancement operations on the decoded video to generate the reconstructed video 140. In some embodiments, separating the decoding algorithm and the postprocessing step can be difficult if not impossible in the context of the system 100. In some embodiments, the combination of the encoder 130 and the decoder 138 is referred to herein as a coder/decoder or "codec." Accordingly, in some embodiments, the codec generates the reconstructed video 140 based on the source video 120.

In some embodiments, the system 100 includes one or more scaling applications (not shown) that can each execute any number and/or types of scaling operations (e.g., downscaling or upscaling operations). In some embodiments, one scaling application generates a scaled video (not shown) based on the source video, and the encoder 130 generates the encoded video 136 based on the scaled video. In the same or other embodiments, one scaling application generates a scaled reconstructed video (not shown) based on the reconstructed video 140. In some embodiments, the techniques described herein can be modified to replace the source video 120 with the scaled video and/or replace the reconstructed video 140 with the scaled reconstructed video.

As shown, the compute instance 110 includes, without limitation, a processor 112 and a memory 116. The processor 112 can be any instruction execution system, apparatus, or device capable of executing instructions. For example, the processor 112 could comprise a central processing unit, a graphics processing unit, a controller, a micro-controller, a state machine, or any combination thereof. The memory 116 stores content, such as software applications and data, for use by the processor 112 of the compute instance 110. The memory 116 can be one or more of a readily available memory, such as random access memory, read only memory, floppy disk, hard disk, or any other form of digital storage, local or remote.

In some other embodiments, each compute instance 110 can include, without limitation, any number of instances of the processor 112 and any number of instances of the memory 116 in any combination. In particular, any number of compute instances 110 (including one) can provide a multiprocessing environment in any technically feasible fashion.

In some embodiments, a storage (not shown) can supplement or replace the memory 116. The storage can include any number and type of external memories that are accessible to the processor 112. For example, and without limitation, the storage can include a Secure Digital Card, an external Flash memory, a portable compact disc read-only memory, an optical storage device, a magnetic storage device, or any suitable combination of the foregoing.

In general, each compute instance 110 is configured to implement one or more software applications. For explanatory purposes only, each software application is described as residing in the memory 116 of the compute instance 110 and executing on the processor 112 of the compute instance 110. However, in some other embodiments, the functionality of each software application can be distributed across any number of other software applications that reside in any number of instances of the memory 116 of any number of compute instances 110 and execute on any number of instances of the processor 112 of any number of compute instances 110 in any combination. Further, the functionality of any number of software applications can be consolidated into a single software application.

In particular, in some embodiments, the compute instance 110 is configured to limit the influence of image enhancement operations when estimating the perceptual video quality of the reconstructed video 140 using a VMAF model 150. In a conventional approach to estimating perceptual video quality of reconstructed video content, the VMAF model 150 is used to estimate a value of a perceptual video quality metric referred to as a "VMAF metric" (not shown) for the reconstructed video content. Values for the VMAF metric are also referred to herein as "perceptual video quality scores" and "VMAF scores." Each VMAF score correlates in a universal manner to subjective human visual experience when viewing corresponding reconstructed video content. In some embodiments, a VMAF score for reconstructed video content quantifies the visual quality as perceived by an average viewer of the reconstructed video content during playback of the reconstructed video content.

The VMAF model 150 can be any machine learning model that is trained to fuse a set of values for a set of features that are relevant to perceptual video quality into a VMAF score that is aligned with subjective quality scores. The subjective quality scores can be any type of score that reflects raw opinion scores assigned by human subjects in response to viewing reconstructed training video content for any number of reconstructed training videos. In some embodiments, the subjective quality scores are mean opinion scores that are generated based on raw opinion scores that are collected during subjective experiments.

A value for a feature is also referred to herein as a "feature value." The set of features associated with the VMAF model 150 are also referred to herein as a "feature vector" and each corresponding set of values is referred to herein as a "feature value vector." Each of the features included in the feature vector is a quantifiable measure that can be used to assess at least one aspect of visual quality or temporal quality associated with reconstructed video content. In some embodiments, any number of the features are visual quality metrics. The feature vector is defined in conjunction with the VMAF model 150 such that the VMAF model 150 is trained to map feature value vectors corresponding to the feature vector to VMAF scores at the same level of granularity.

The VMAF model 150 can implement any number and/or types of machine learning algorithms that are trained to fuse feature value vectors to VMAF scores based on subjective quality scores. Some examples of machine learning algorithms include, without limitation, support vector regression algorithms, artificial neural network algorithms, tree-based regression algorithms, and tree-based ensemble methods (e.g., random forest algorithms, gradient boosting algorithms, etc.).

One drawback of the conventional approach to estimating perceptual video quality of reconstructed video content described above is that the impact of data compression operations on perceptual video quality can be difficult to assess based on VMAF scores when image enhancement operations are applied within a codec. As described previously herein, because the VMAF score is a single integer, and the enhancement gain is usually unknown, the enhancement gain obscures the impact that the data compression operations implemented by the codec have on the perceptual video quality of the resulting reconstructed video.

Modifying the VMAF Metric to Limit the Measurable Enhancement Gain

To address the above problems, the system 100 includes, without limitation, a tunable VMAF application 160 that institutes a modified version of the VMAF metric referred to herein as a "tuned VMAF metric." The tuned VMAF metric estimates the perceptual video quality of reconstructed video content subject to configurable enhancement gain limits that limit or disable the enhancement gain measurable by the tuned VMAF metric. As used herein, an "enhancement gain" is an increase that is attributable to image enhancement operations. The enhancement gain measured by a metric (e.g., a VIM quality index, a DLM, the VMAF metric) refers to an increase in a value for the metric that is attributable to image enhancement operations. And the enhancement gain measurable by a metric is the maximum enhancement gain that can be measured by the metric.

As shown, in some embodiments, the tunable VMAF application 160 generates an overall tuned VMAF score 198 based on the source video 120, the reconstructed video 140, the VMAF model 150, a tunable feature vector 172, a VIF enhancement gain limit 162, and a DLM enhancement gain limit 164. The tunable feature vector 172 is a modified version of the feature vector associated with the VMAF model 150.

In some embodiments, for each feature included in the feature vector, the tunable feature vector 172 can include, without limitation, either the same feature or a corresponding tuned feature (not shown). Each tuned feature is version of the corresponding feature that is modified to disable and/or limit the enhancement gains measured for the feature. The tunable feature vector 172 can include, without limitation, any number (including none) of features and any number of tuned features in any combination. For instance, in some embodiments, for each feature of the feature vector that takes image enhancement operations into account, the tunable feature vector 172 includes a corresponding tuned feature. For each feature of the feature vector that does not take image enhancement operations into account, the tunable feature vector 172 includes the feature.

For explanatory purposes only, the tunable VMAF application 160 and the tunable feature vector 172 are described herein in the context of the VMAF model 150 that is associated with a feature vector that includes, without limitation, four features that are the VIF quality index at VIF scales 174(1)-174(4), respectively, a feature that is the DLM, and a feature that is a TI quality metric. The VIF scales 174(1)-174(4) are different spatial scales. The VIF quality index and the DLM are both visual quality metrics, and the TI quality metric is a temporal quality metric. In some other embodiments, the VMAF model 150 can be associated with a feature vector that includes, without limitation, any number and/or types of features, and the techniques described herein are modified accordingly.

The VIF quality index captures visual information fidelity loss at an associated spatial scale, the DLM captures loss of details, and the TI quality metric captures temporal distortions associated with and/or causing motion that are quantified by differences between adjacent pairs of the reconstructed frames 142. The VIF quality index and the DLM take image enhancement operations into account, but the TI quality metric does not take image enhancement operations into account. Accordingly, in some embodiments, the tunable feature vector 172 includes, without limitation, four tuned features that are a tunable VIF quality index at the VIF scales 174(1)-174(4), respectively, a feature that is a tuned DLM, and the feature that is the TI quality metric. The enhancement gains for each tuned feature can be limited and/or disabled in any technically feasible fashion.

As described in greater detail below in conjunction with FIG. 3, in some embodiments, the enhancement gain that is measurable by the tunable VIF quality index is controlled via the VIF enhancement gain limit 162. The VIF enhancement gain limit 162 is symbolized as $EGL_{VIF}$ and can be any value that is greater than or equal to 1.0. In some embodiments, as the VIF enhancement gain limit 162 increases, a limit for the enhancement gain that is measurable by the tunable VIF quality index increases. In the same or other embodiments, if the VIF enhancement gain limit 162 is equal to 1.0, then the enhancement gain is disabled for (i.e., no enhancement gain is measurable by) the tunable VIF quality index). If the enhancement gain is disabled for the tunable VIF quality index, then the influence of image enhancement operations is disregarded when computing values for the tunable VIF quality index.

As described in greater detail below in conjunction with FIG. 4, in some embodiments, the enhancement gain that is measurable by the tuned DLM is controlled via the DLM enhancement gain limit 164. The DLM enhancement gain limit 164 is symbolized as $EGL_{DLM}$ and can be any value that is greater than or equal to 1.0. In some embodiments, as the DLM enhancement gain limit 164 increases, a limit for the enhancement gain that is measurable by the tunable DLM increases. In the same or other embodiments, if the DLM enhancement gain limit 164 is equal to 1.0, then the enhancement gain is disabled for the tunable DLM. If the enhancement gain is disabled for the tunable DLM, then the influence of image enhancements operations is disregarding when computing values for the tunable DLM.

As shown, in some embodiments, the tunable VMAF application 160 includes, without limitation, a tunable feature engine 170, VMAF models 150(1)-150(F), and a pooling engine 192. As described in greater detail below, the tunable feature engine 170 generates tuned feature value vectors 180(1)-180(F) based on the source video 120, the reconstructed video 140, the tunable feature vector 172, the VIF scales 174(1)-174(4), the VIF enhancement gain limit 162, and the DLM enhancement gain limit 164.

The tuned feature value vectors 180(1)-180(F) correspond to the tunable feature vector 172 and the reconstructed frames 142(1)-142(F), respectively. For explanatory purposes only, the tuned feature value vectors 180(1)-180(F) are also referred to herein individually as "the tuned feature value vector 180" and collectively as "the tuned feature value vectors 180." Each feature value vector 180 includes, without limitation, a different value for each feature and each tuned feature included in the tunable feature vector 172. A value for a tuned feature is also referred to herein as a "tuned feature value."

Notably, the enhancement gains for the tuned feature values associated with the tunable VIF quality index are limited based on the VIF enhancement gain limit 162. And the enhancement gains for the tuned feature values associated with the tuned DLM are limited based on the DLM enhancement gain limit 164. Because the TI quality metric does not take image enhancement operations into account, the feature values associated with the TI quality metric do not include any increases attributable to image enhancement operations. The influence of image enhancement operations can therefore be limited or disabled across each of the tuned feature value vectors 180 via the VIF enhancement gain limit 162 and the DLM enhancement gain limit 164.

The VMAF models 150(1)-150(F) are different instances of the VMAF model 150. In some embodiments, the tunable VMAF application 160 executes the VMAF models 150(1)-150(F) based on the tuned feature value vectors 180(1)-180(F), respectively, to generate the tuned VMAF scores 158(1)-158(F), respectively. The tuned VMAF scores 158(1)-158(F) are also referred to herein individually as "the tuned VMAF score 158" and collectively as "the tuned VMAF scores 158."

Because the enhancement gains of the tuned feature values are limited, each of the tuned VMAF scores 158 is a value of the VMAF metric for which the enhancement gain is limited. More specifically, the influence of image enhancement operations on the perceptual video quality estimated by each tuned VMAF score 158 score can be indirectly limited or disabled via the VIF enhancement gain limit 162 and the DLM enhancement gain limit 164. Any number of the tuned VMAF scores 158(1)-158(F) can therefore account at least in part, for image enhancement operation(s) associated with the reconstructed video 140. As referred to herein, if the tuned VMAF score 158 for given reconstructed video content accounts, at least in part, for image enhancement operation(s), then an enhancement gain reflected in the tuned VMAF score 158 is less than an enhancement gain reflected in a conventional VMAF score for the reconstructed video content. Accordingly, any number of the tuned VMAF scores 158(1)-158(F) can be less than VMAF scores for the reconstructed frames 142(1)-142(F), respectively.

In some other embodiments, the tunable VMAF application 160 can include, without limitation, any number of instances of the VMAF model 150, and the tunable VMAF application 160 can configure the instances of the VMAF model 150 to map the tuned feature value vectors 180 to the tuned VMAF scores 158 sequentially, concurrently, or in any combination thereof. For instance, in some embodiments, the tunable VMAF application 160 configures a single instance of the VMAF model 150 to sequentially map the tuned feature value vectors 180(1)-180(F) to the tuned VMAF scores 158(1)-158(F), respectively.

As shown, in some embodiments, the tunable VMAF application 160 configures the pooling engine 192 to compute the overall tuned VMAF score 198 based on the tuned VMAF scores 158(1)-158(F). The overall tuned VMAF score is a tuned VMAF score for the reconstructed video 140. The influence of image enhancement operations on the perceptual video quality estimated via the overall tuned VMAF score 198 score can be indirectly limited or disabled via the VIF enhancement gain limit 162 and the DLM enhancement gain limit 164. The overall tuned VMAF score 198 can therefore be less than a VMAF score for the reconstructed video 140. The pooling engine 192 can compute the overall tuned VMAF score 198 based on the tuned VMAF scores 158(1)-158(F) in any technically feasible fashion.

In some embodiments, the pooling engine 192 performs any number and/or types of temporal pooling operations on the tuned VMAF scores 158(1)-158(F) to compute the overall tuned VMAF score 198. For instance, in some embodiments, the pooling engine 192 sets the overall tuned VMAF score 198 equal to the arithmetic mean of the tuned VMAF scores 158(1)-158(F). In some embodiments, the overall tuned VMAF score 198 is an estimate for the average perceptual video quality across the reconstructed video 140 that discounts the influence of image enhancement operations on the average perceptual video quality of the reconstructed video 140.

In some embodiments, the tunable VMAF application 160 stores the overall tuned VMAF score 198 in any memory that is accessible by any number of software applications for future use. In the same or other embodiments, the tunable VMAF application 160 transmits the overall tuned VMAF score 198 to any number of software applications for future use.

In some embodiments, the tunable VMAF application 160 can compute any number of instances of the overall tuned VMAF score 198 for any number of reconstructed videos 140. For explanatory purposes only, instances of the overall tuned VMAF scores 198 are also referred to herein individually as "the overall tuned VMAF score 198" and collectively as "the overall tuned VMAF scores 198." In the same or other embodiments, the tunable VMAF application 160 can store any number of tuned VMAF scores 158 and/or overall tuned VMAF scores 198 in any memory. In some embodiments, the tunable VMAF application 160 can transmit any number of tuned VMAF scores 158 and/or overall tuned VMAF scores 198 to any number and/or types of software applications in any combination. In the same or other embodiments, the tunable VMAF application 160 does not compute the overall tuned VMAF score 198 and can therefore omit the pooling engine 192.

In some embodiments, the tunable VMAF application 160 can compute any number of instances of the overall tuned VMAF score 198 for any number of reconstructed videos 140. In the same or other embodiments, the tunable VMAF application 160 can store any number of the tuned VMAF scores 158 in memory and/or transmit any number of tuned VMAF scores 158 to any number and/or types of software applications. In the same or other embodiments, the tunable VMAF application 160 does not compute the overall tuned VMAF score 198 and can therefore omit the pooling engine 192.

In some embodiments, the tunable VMAF application 160 can configure the VMAF model 150 to compute the tuned VMAF scores 158 at any level of granularity and the techniques described herein are modified accordingly. For instance, in some embodiments, the tunable VMAF application 160 inputs the tuned feature value vectors 180(1)-180(F) into the pooling engine 192 to generate an aggregate feature value vector (not shown). The tunable VMAF application 160 then maps the aggregate feature value vector to the overall tuned VMAF score 198 via the VMAF model 150.

Advantageously, the tunable VMAF application 160 can be used to limit and/or disable the influence of image enhancement operations on perceptual video quality estimations for reconstructed video content. As a result, the impact of data compression operations on perceptual video quality can be more accurately quantified. More specifically, because the tunable feature engine 170 can reduce the enhancement gains included in the tuned feature value vector 180 relative to a conventional feature value vector, the enhancement gains reflected in the overall tuned VMAF score 198 can be reduced relative to a conventional overall VMAF score for the reconstructed video 140. Thus, the overall tuned VMAF score 198 can more accurately reflect the impact of codec data compression operations on perceptual video quality levels.

In some embodiments, when separating image enhancement operations from one or more codecs is not feasible, a codec evaluation application (not shown) sets both the VIF enhancement gain limit and the DLM enhancement gain limit to 1.0. In the same or other embodiments, based on the VIF enhancement gain limit of 1.0 and the DLM enhancement gain limit of 1.0, the tunable VMAF application 160 disregards the influence of image enhancement operations when computing the overall tuned VMAF scores 198. Because the codec evaluation application uses the overall tuned VMAF scores 198 instead of VMAF scores to evaluate the different codecs, the likelihood that the codec evaluation application erroneously attributes enhancement gains to data compression operations implemented by the codecs is reduced. The accuracy of the evaluation results can therefore be increased.

Furthermore, empirical results have shown that certain types of image enhancement operations can be overused. When image enhancement operations are overused, the visual quality of reconstructed video content as perceived by actual viewers can be less than visual quality levels estimated via typical visual quality metrics the VIF quality index, the DLM, etc.). Advantageously, the VIF enhancement gain limit 162 and the DLM enhancement gain limit 164 can be set to values that decrease the likelihood that the overall tuned VMAF score 198 overestimates the perceptual video quality of the reconstructed video 140 when image enhancement operations are overused.

In some embodiments, any number of the techniques described herein can be used to determine which of any number of encoded versions of the source video 120 to stream to a playback device. For instance, in some embodiments, an encoding ladder application (not shown) uses the tunable VMAF application 160 to compute overall tuned VMAF scores 198 for any number of reconstructed videos 140 derived from different encoded versions of the source video 120. Based on the overall tuned VMAF scores 198, the encoding ladder application generates an encoding ladder that represents tradeoffs between bitrate and quality for the source video 120. An endpoint application executing on the playback device can select one of the encoded versions of the source video 120 based on the encoding ladder and an available network bandwidth. The endpoint application can then cause at least one encoded frame of the selected encoded version of the source video 120 to be streamed to the playback device.

Note that the techniques described herein are illustrative rather than restrictive and may be altered without departing from the broader spirit and scope of the invention. Many modifications and variations on the functionality provided by the tunable VMAF application 160, the tunable feature engine 170, the VMAF model 150, and the pooling engine 192 will be apparent to those of ordinary skill in the art without departing from the scope and spirit of the described embodiments.

It will be appreciated that the system 100 shown herein is illustrative and that variations and modifications are possible. For instance, in some embodiments, the tunable VMAF application 160 can compute overall tuned VMAF score 198 for any number of reconstructed videos 140 generated by any number of codecs based on any number of source videos 120. Further, the connection topology between the various components in FIG. 1 may be modified as desired.

Figure 2:
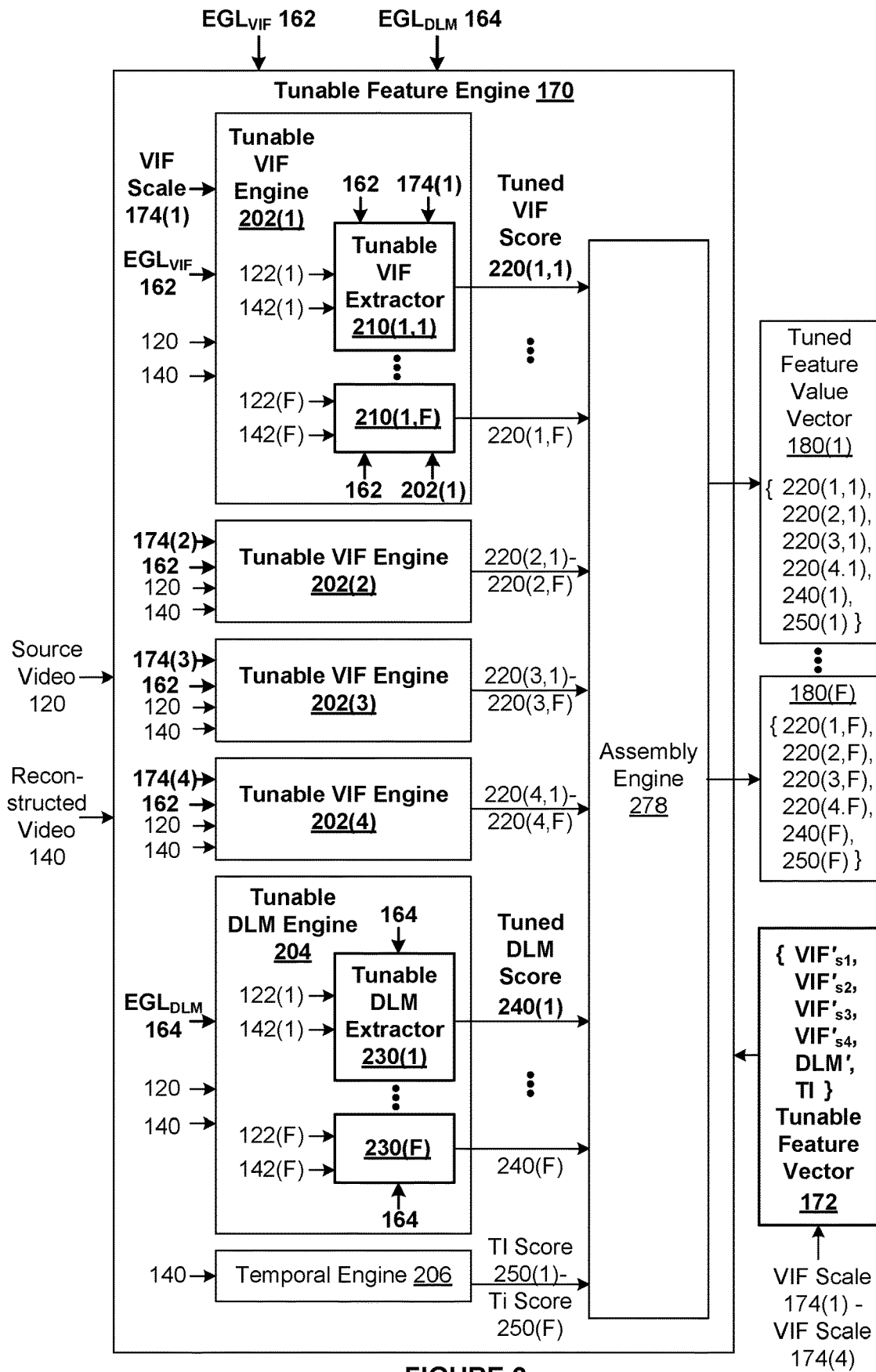
FIG. 2 is a more detailed illustration of the tunable feature engine of FIG. 1, according to various embodiments.

FIG. 2 is a more detailed illustration of the tunable feature engine 170 of FIG. 1, according to various embodiments. As shown, the tunable feature engine 170 computes the tuned feature value vectors 180(1)-180(F) based on the source video 120, the reconstructed video 140, the tunable feature vector 172, the VIF enhancement gain limit 162, and the DLM enhancement gain limit 164. As described previously herein in conjunction with FIG. 1, the source video 120 includes, without limitation, the source frames 122(1)-122(F). The reconstructed video 140 includes, without limitation, the reconstructed frames 142(1)-142(F) corresponding to the source frames 122(1)-122(F), respectively.

The tuned feature value vectors 180(1)-180(F) correspond to the tunable feature vector 172 and the reconstructed frames 142(1)-142(F), respectively. As described previously herein in conjunction with FIG. 1, in some embodiments, the tunable feature vector 172 can include, without limitation, any number and/or types of features and any number and/or types of tuned features that are consistent with the VMAF model 150. For each of the tuned features, the enhancement gain can be disabled and/or limited in any technically feasible fashion and, as a result, the enhancement gains of the corresponding tuned feature values can be disabled and/or limited.

As shown, in some embodiments, the tunable feature vector 172 includes, without limitation, four tunable features that are the tuned VIF quality index at the VIF scales 174(1)-174(4), a tunable feature that is the tuned DLM, and a feature that is the TI quality metric. The four tunable features that are the tuned VIF quality index at the VIF scales 174(1)-174(4) are also referred to herein as "tunable VIF features." The tunable VIF features are denoted as $VIF'_{s1}$, $VIF'_{s2}$, $VIF'_{s3}$, and $VIF'_{s4}$ and are associated with the VIF scales 174(1)-174(4), respectively. The tunable feature that is the tuned DLM is also referred to herein as "a tunable DLM feature" and is denoted herein as DLM'. For $VIF'_{s1}$, $VIF'_{s2}$, $VIF'_{s3}$, and $VIF'_{s4}$, and DLM', the prime symbol indicates that, in the context of the tunable feature engine 170, the enhancement gains are disabled and/or limited. The feature associated with the TI quality metric is denoted as TI and captures temporal distortions associated with and/or causing motion that are quantified by differences between adjacent pairs of the reconstructed frames 142.

In some embodiments, the tunable feature engine 170 includes, without limitation, tunable VIF engines 202(1)-202(4), a tunable DLM engine 204, and a temporal engine 206. The tunable VIF engines 202(1)-202(4) are instances of a single software application referred to herein as "the tunable VIF engine 202" that are associated with the VIF scales 174(1)-174(4), respectively. For explanatory purposes only, the tunable VIF engines 202(1)-202(4) are also referred to herein individually as "the tunable VIF engine 202" and collectively as "the tunable VIF engines 202."

In the same or other embodiments, the tunable feature engine 170 configures the tunable VIF engines 202(1)-202(4) to compute tuned VIF scores 220(1,1)-220(1,F), 220(2,1)-220(2,F), 220(3,1)-220(3,F), and 220(4,1)-220(4,F), respectively based on the source video 120, the reconstructed video 140, the VIF enhancement gain limit 162, and the VIF scales 174(1)-174(F), respectively. The tuned VIF scores 220(1,1)-220(1,F), 220(2,1)-220(2,F), 220(3,1)-220(3,F), and 220(4,1)-220(4,F) are values for the tunable VIF quality index at the VIF scales 174(1)-174(4), respectively.

For explanatory purposes only, the tuned VIF scores 220(1,1)-220(1,F), 220(2,1)-220(2,F), 220(3,1)-220(3,F), and 220(4,1)-220(4,F) are also referred to herein individually as "the tuned VIF score 220" and collectively as "the tuned VIF scores 220." In the parenthetical notation used to distinguish between the tuned VIF scores 220 where needed, where the first integer is an index into the VIF scales 174(1)-174(4) and the second integer is an index into the reconstructed frames 142(1)-142(F).

As shown, the tunable VIF engine 202(1) includes, without limitation, tunable VIF extractors 210(1,1)-210(1,F). Although not shown, the tunable VIF engine 202(2) includes, without limitation, tunable VIF extractors 210(2,1)-210(2,F). The tunable VIF engine 202(3) includes, without limitation, tunable VIF extractors 210(3,1)-210(3,F). And the tunable VIF engine 202(4) includes, without limitation, tunable VIF extractors 210(4,1)-210(4,F).

The tunable VIF extractors 210(1,1)-210(1,F), 210(2,1)-210(2,F), 210(3,1)-210(3,F), and 210(4,1)-210(4,F) are instances of a single software application referred to herein as "the tunable VIF extractor 210." For explanatory purposes only, the tunable VIF extractors 210(1,1)-210(1,F), 210(2,1)-210(2,F), 210(3,1)-210(3,F), and 210(4,1)-210(4,F) are also referred to herein individually as "the tunable VIF extractor 210" and collectively as "the tunable VIF extractors 210."

For explanatory purposes only, the parenthetical notation used to distinguish between the tunable VIF extractors 210 where needed matches the parenthetical notation used to distinguish between the tuned VIF scores 220 where needed. In some embodiments, the tunable VIF engine 202(x), where x is an integer from 1 to 4 configures the tunable VIF extractor 210(x,y) where y is an integer from 1 to F, to compute the tuned VIF score 220(x,y) based on the source frame 122(y), the reconstructed frame 142(y), the VIF enhancement gain limit 162, and the scale 174(x). For instance, in some embodiments, the tunable VIF engine 202(1) configures the tunable VIF extractors 210(1,1)-174(1, F) to compute the tuned VIF scores 220(1,1)-220(1-F), respectively, based on the source frame 122(1)-122(F), respectively, the reconstructed frames 142(1)-142(F), respectively, the VIF enhancement gain limit 162, and the scale 174(1).

In some other embodiments, the tunable feature engine 170 and/or any number (including none) of tunable VIF engines 202 can configure any number of tunable VIF extractors 210 to compute the tuned VIF scores 220 sequentially, concurrently, or in any combination thereof. For instance, in some embodiments, the tunable feature engine 170 omits the tunable VIF engines 202 and configures a single instance of the tunable VIF extractor 210 to sequentially compute the tuned VIF score 220 for each combination of the reconstructed frames 142(1)-142(F) and the VIF scales 174(1)-174(F).

As described in detail below in conjunction with FIG. 3, the tunable VIF extractor 210 implements the tunable VIF quality index. The tunable VIF quality index is a modified version of the VIF quality index in which the influence of image enhancement operations on each tuned VIF score 220 is limited or disabled based on the VIF enhancement gain limit 162. Accordingly, relative to an increase in a VIF score (not shown) that is attributable to image enhancement operations, the increase in the tuned VIF score 220 that is attributable to image enhancement operations can be reduced. In some embodiments, if the VIF enhancement gain limit 162 is equal to 1.0, then the tunable VIF extractor 210 does not measure any enhancement gain and therefore the enhancement gain is disabled for the tuned VIF scores 220.

As shown, in some embodiments, the tunable feature engine 170 configures the tunable DLM engine 204 to compute tuned DLM scores 240(1)-240(F) based on the source video 120, the reconstructed video 140, and the DLM enhancement gain limit 164. The tuned DLM scores 240(1)-240(F) are values for the tunable DLM metric for the reconstructed frames 142(1)-142(F), respectively. For explanatory purposes only, the tuned DLM scores 240(1)-240(F) are also referred to herein individually as "the tuned DLM score" and collectively as "tuned DLM scores 240."

In some embodiments, the tunable DLM engine 204 includes, without limitation, tunable DLM extractors 230(1)-230(F). The tunable DLM extractors 230(1)-230(F) are instances of a single software application referred to herein as "the tunable DLM extractor 230." For explanatory purposes only, the tunable DLM extractors 230(1)-230(F) are also referred to herein individually as "the tunable DLM extractor 230" and collectively as "the tunable DLM extractors 310." In some embodiment, the tunable DLM engine 204 configures the tunable DLM extractors 230(1)-230(F) to compute the tuned DLM scores 240(1)-240(F) based on the source frames 122(1)-122(F), respectively, the reconstructed frames 142(1)-142(F), respectively, and the DLM enhancement gain limit 164.

In some other embodiments, the tunable feature engine 170 and/or the tunable DLM engine 204 can configure any number of tunable DLM extractors 230 to compute the tuned DLM scores 240 sequentially, concurrently, or in any combination thereof. For instance, in some embodiments, the tunable feature engine 170 omits the tunable DLM engine 204 and configures a single instance of the tunable DLM extractor 230 to sequentially compute the tuned DLM scores 240(1)-240(F) for the reconstructed frames 142(1)-142(F), respectively.

As described in detail below in conjunction with FIG. 4, the tunable DLM extractor 230 implements the tunable DLM. The tunable DLM is a modified version of the DLM in which the influence of image enhancement operations on each tuned DLM score 240 is limited based on the DLM enhancement gain limit 164. Accordingly, relative to an increase in a value for the DLM that is attributable to image enhancement operations, the increase in the tuned DLM score 240 that is attributable to the image enhancement operations can be reduced. In some embodiments, if the DLM enhancement gain limit 164 is equal to 1.0, then the tunable DLM extractor 230 does not measure any enhancement gain and therefore the enhancement gain is disabled for the tuned DLM scores 240.

As shown, in some embodiments, the temporal engine 206 generates TI scores 250(1)-250(F) based on the reconstructed video 140. The TI scores 250(1)-250(F) are values for the TI quality metric for the reconstructed frames 142(1)-142(F), respectively. For explanatory purposes only, the tuned TI scores 250(1)-250(F) are also referred to herein individually as "the TI score 250" and collectively as "the TI scores 250." The temporal engine 206 can generate the TI scores 250(1)-250(F) in any technically feasible fashion that is consistent with the TI quality metric.

In some embodiments, the temporal engine 206 sets the TI scores 250($y$), where y is an integer from 1 to F, equal to a mean co-located pixel difference of the reconstructed frames 142($y$) with respect to one of the reconstructed frames 142 that is temporally adjacent to the reconstructed frame 142($y$). More specifically, the temporal engine 206 generates a frame pair that includes, without limitation, the reconstructed frame 142($y$) and one of the reconstructed frames 142 that is temporally adjacent to the reconstructed frame 142($y$). For instance, in some embodiments, the frame pair associated with the reconstructed frame 142(1) includes, without limitation, the reconstructed frame 142(1) and the reconstructed frame 142(2). The temporal engine 206 computes per-pixel differences between the reconstructed frames 142 included in the frame pair. The temporal engine 206 then sets the TI score 250($y$) equal to the average of the per-pixel differences for the frame pair.

As shown, the assembly engine 278 generates the tuned feature value vectors 180(1)-180(F) based on the tuned VIF scores 220, the tuned DLM scores 240, and the TI scores 250 as per the tunable feature vector 172. The assembly engine 278 can generate the tuned feature value vectors 180 in any technically feasible fashion. In some embodiments, for the reconstructed frame 142($y$), where y is an integer between 1 and F, the assembly engine 278 arranges the tuned VIF scores 220(1,$y$), 220(2,$y$), 220(3,$y$), and 220(4,$y$), the tuned DLM score 240($y$), and the TI score 250($y$) in the order specified in the tunable feature vector 172 to generate the tuned feature value vector 180($y$).

In some embodiments, based on the ordering of the features within the tunable feature vector 172, the assembly engine 278 generates the tuned feature value vector 180(1) that includes, sequentially and without limitation, the tuned VIF scores 220(1,1), 220(2,1), 220(3,1), and 220(4,1), the tuned DLM score 240(1), and the TI score 250(1). Similarly, the assembly engine 278 generates the tuned feature value vector 180(F) that includes, sequentially and without limitation, the tuned VIF scores 220(1,F), 220(2,F), 220(3,F), and 220(4,F), the tuned DLM score 240(F), and the TI score 250(F).

Computing Tuned VIF Scores

Figure 3:
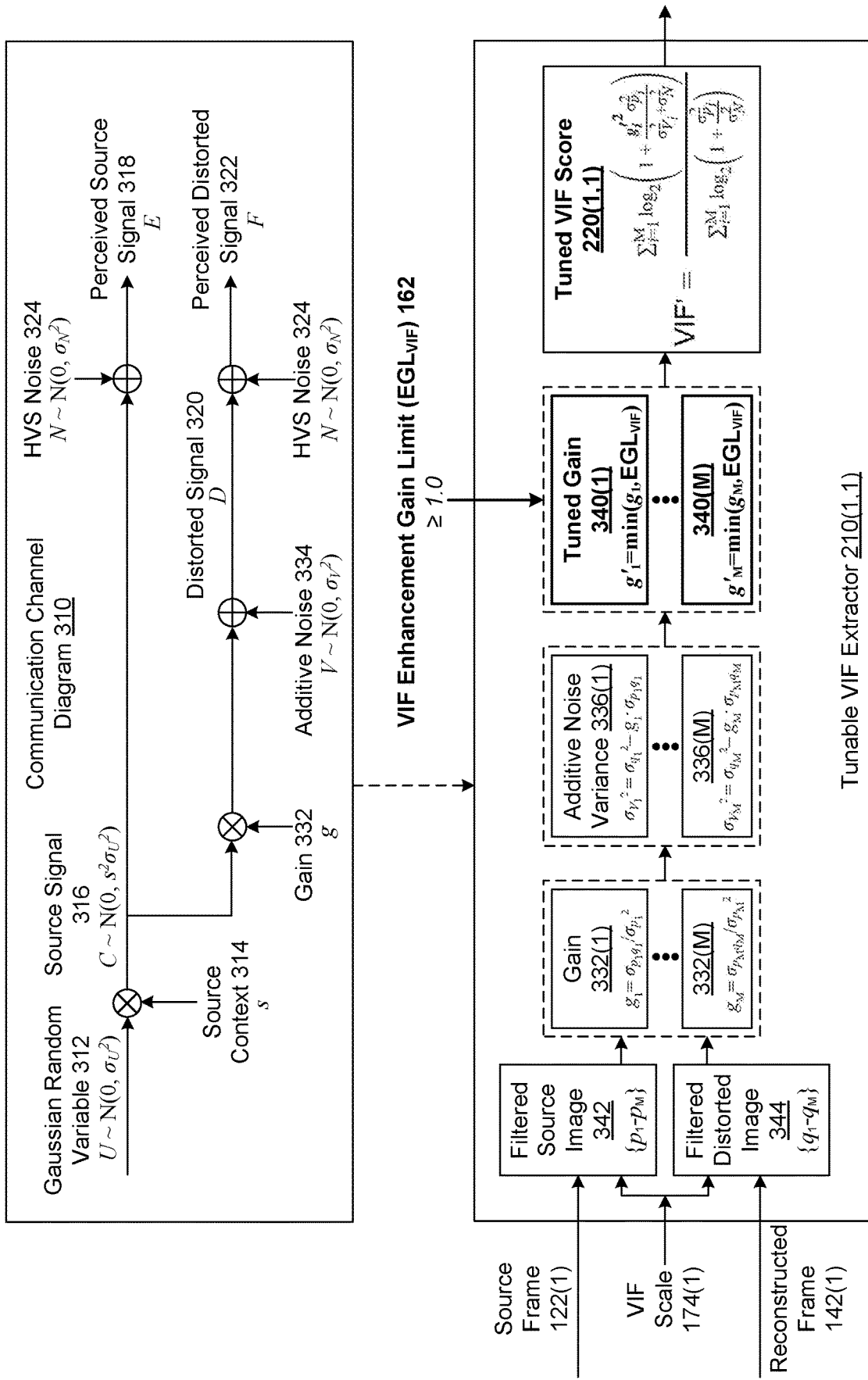
FIG. 3 is a more detailed illustration of one of the tunable Visual Information Fidelity ("VIF") extractors of FIG. 2, according to various embodiments.

FIG. 3 is a more detailed illustration of one of the tunable VIF extractors 210 of FIG. 2, according to various embodiments. For explanatory purposes only, the functionality of the tunable VIF extractors 210 is described in FIG. 3 in the context of the tunable VIF extractor 210(1,1)) of FIG. 2. The tunable VIF extractor 210(1,1) implements the tunable VIF quality index and computes the tuned VIF score 220(1,1) of the reconstructed frame 142(1) at the VIF scale 174(1).

As described in greater detail below, relative to an increase in a value for the VIF quality index or "VIF score" (not shown) of the reconstructed frame 142(1) at the VIF scale 174(1) that is attributable to image enhancement operations, the increase in the tuned VIF score 220(1,1) that is attributable to image enhancement operations can be reduced. More specifically, the tunable VIF extractor 210(1,1) limits the influence of image enhancement operations on the tuned VIF score 220(1,1) based on the VIF enhancement gain limit 162.

As described previously herein in conjunction with FIG. 2, in some embodiments, any number of instances of the tunable VIF extractor 210 can be configured to compute the tuned VIF scores 220 of the reconstructed frames 142 at the VIF scales 174(1)-174(4) in any combination based on the techniques described below. In the same or other embodiments, the techniques described herein in conjunction with the tunable VIF extractor 210(1,1) are applicable to computing the tuned VIF score 220 of any type of distorted signal that is derived from any type of source signal at any scale.

As depicted with a dashed arrow, the tunable VIF extractor 210(1,1) determines the tuned VIF score 220(1,1) based on how the VIF quality index models the image quality assessment problem. As persons skilled in the art will recognize, the VIF quality index models the image quality assessment problem as a communication channel that is depicted via the communication channel diagram 310.

In the communication channel diagram 310, C denotes a source signal 316 and E denotes a perceived source signal 318. The perceived source signal 318 is the source signal 316 as perceived by a human vision system ("HVS"). The source signal 316 is modeled as C=sU, where s denotes a source context 314 in the source signal 316 that is estimated via low-pass filtering, and U denotes a Gaussian random variable 312 that characterizes a local variability and is represented as $N(0, \sigma_U^2)$. The source signal 316 is therefore represented as $N(0, s^2\sigma_U^2)$.

As shown, D denotes a distorted signal 320 and F denotes a perceived distorted signal 322. The perceived distorted signal 322 is the distorted signal 320 as perceived by the HVS. The HVS is modeled as a white additive noise channel with an HVS noise 324, where N denotes the HVS noise 324. The HVS noise 324 is represented as $N(0, \sigma_N^2)$. A mutual information measure I(C; E|s) (not shown) denotes the maximum information that can be conveyed through the white additive noise channel. A VIF score (not shown) for the distorted signal 320 is equal to the ratio between a mutual information measure I(C; E|s) and the mutual information measure I(C; F|s).

The distortion associated with the distorted signal 320 is modeled by two terms g and V, where g denotes a gain 332 and V denotes an additive noise 334. The additive noise 334 is represented as $N(0, \sigma_V^2)$, where $\sigma_V^2$ denotes an additive noise variance 336 (not explicitly shown). Based on the source signal 316 and the distorted signal, 320, the gain 332 and the additive noise variance 336 can be estimated using maximum likelihood estimation. The resulting estimates can be expressed as the following equations (1) and (2).

$$g = \sigma_{CD}/\sigma_C^2 \qquad (1)$$

$$\sigma_V^2 = \sigma_C^2 - g \cdot \sigma_{CD} \qquad (2)$$

In some embodiments, the tunable VIF extractor 210(1,1) implements a pixel-domain version of the VIF quality index based on the model depicted via the communication channel diagram 310 and modified based on the VIF enhancement gain limit 162. As shown, the inputs to the tunable VIF extractor 210(1,1) are the source frame 122(1), the reconstructed frame 142(1), the VIF scale 174(1), and the VIF enhancement gain limit 162. And, the output of the tunable VIF extractor 210 is the tuned VIF score 220(1,1).

As shown, in some embodiments, the tunable VIF extractor 210(1,1) applies successive Gaussian filtering operations to the source frame 122(1) based on the VIF scale 174(1) to generate a filtered source image 342. Referring back to the communication channel diagram 310, the filtered source image 342 corresponds to the source signal 316. The pixels of the filtered source image 342 are denoted herein as $p_1$-$p_M$, where M is the number of pixels in the filtered source image 342. As also shown, the tunable VIF extractor 210(1,1) applies successive Gaussian filtering operations to the reconstructed frame 142(1) based on the VIF scale 174(1) to generate a filtered distorted image 344. Referring back to the communication channel diagram 310, the filtered distorted image 344 corresponds to the distorted signal 320. The pixels of the filtered distorted image 344 are denoted herein $q_1$-$q_M$.

In some embodiments, the tunable VIF extractor 210(1,1) computes gains 332(1)-332(M) based on the filtered source image 342 and the filtered distorted image 344. The gains 332(1)-332(M) are local estimates of the gain 332 associated with the filtered distorted image 344. The tunable VIF extractor 210(1,1) can compute the gains 332(1)-332(M) in any technically feasible fashion. In some embodiments, the tunable VIF extractor 210(1,1) computes the gains 332(1)-332(M) that are denoted as $g_M$, respectively, based on the following equation (3), using values for the integer i of 1-M, respectively.

$$g_i = \sigma_{p_i q_i}/\sigma_{p_i}^2 \qquad (3)$$

In the same or other embodiments, the tunable VIF extractor 210(1,1) computes additive noise variances 336(1)-336(M) based on the gains 332(1)-332(M), respectively, the filtered source image 342, and the filtered distorted image 344. The additive noise variances 336(1)-336(M) are local estimates of the additive noise variance 336 associated with the filtered distorted image 344. The tunable VIF extractor 210(1,1) can compute the additive noise variances 336(1)-336(M) in any technically feasible fashion. In some embodiments, the tunable VIF extractor 210(1,1) computes the additive noise variances 336(1)-336(M) that are denoted as $\sigma_{V_1}^2$-$\sigma_{V_2}^2$, respectively, based on the following equation (4), using values for the integer i of 1-M, respectively.

$$\sigma_{V_i}^2 = \sigma_{q_i}^2 - g_i \cdot \sigma_{p_i q_i} \qquad (4)$$

Although not shown, a value for the VIF quality index or "VIF score" for the reconstructed frame 142(1) at the VIF scale 174(1) can be computed based on the following equation (5):

$$VIF = \frac{\sum_{i=1}^{M} \log_2\left(1 + \frac{g_i^2 \sigma_{p_i}^2}{\sigma_{V_i}^2 + \sigma_N^2}\right)}{\sum_{i=1}^{M} \log_2\left(1 + \frac{\sigma_{p_i}^2}{\sigma_N^2}\right)} \qquad (5)$$

In equation (5), VIF denotes the VIF score and $\sigma_N^2$ is a constant (e.g., 2.0) that estimates the variance of the HVS noise 324.

As per equation (5), if the source frame 122 and the reconstructed frame 142 are identical, then the VIF score is one. Furthermore, scaling operations (e.g., downsampling operations) and data compression that selectively eliminate information act as low-pass filtering. Scaling operations and data compression operations therefore typically result in local estimates of the gain 332 that are less than one and local estimates of the additive noise variance 336 that are greater than zero. Consequently, as per equation (5), when scaling and/or data compression operations but not image enhancement operations are used to generate the encoded video 136, the VIF score is less than or equal to one.

By contrast, image enhancement operations (e.g., sharpening operations and contrasting operations) can result in local estimates of greater than one for the gain 332. And, as per equation (5), if the "positive" influence from the local estimates of the gain 332 outweigh the "negative" influence from the local estimates of the additive noise variance 336, then the VIF score increases.

For example, for a linear contrast operation in which the source frame 122(1) is multiplied by 1.5 to generate the reconstructed frame 142(1), the local estimates of the gain 332 are 1.5 and the local estimates of the additive noise variance 336 are 0. As per equation (5), such a linear constant operation results in a VIF score that is greater than one. And a VIF score that is greater than one translates into a gain when used to compute a VMAF score via the VMAF model 150.

Empirical results have shown that limiting each of the local estimates of the gain 332 to less than 1.0 effectively mitigates the enhancement gain that is measured by the VIF quality index. And limiting each of the local estimates of the gain 332 to 1.0 ensures that the VIF score does not exceed 1.0. Accordingly, to control the enhancement gain that is measured by tunable VIF extractor 210(1,1), the tunable VIF extractor 210(1,1) restricts each of the local estimates of the gain 332 to a maximum of the VIF enhancement gain limit 162 when computing the tuned VIF score 220(1,1). As described previously herein in conjunction with FIG. 1, the VIF enhancement gain limit 162 can be any value that is greater than or equal to 1.0. The tunable VIF extractor 210(1,1) can restrict the local estimates of the gain 332 and compute the tuned VIF score 220(1,1) in any technically feasible fashion.

In some embodiments, to control the enhancement gain that is measured by the tunable VIF quality index, the tunable VIF extractor 210(1,1) modifies the gains 332(1)-322(M) based on the VIF enhancement gain limit 162 to compute tuned gains 340(1)-340(M). Each of the tuned gains 340(1)-340(M) is a local estimate of a tuned gain 340 (not explicitly shown). The tunable VIF extractor 210(1,1) can compute the tuned gains 340(1)-340(M) in any technically feasible fashion. In some embodiments, the tunable VIF extractor 210(1,1) computes the tuned gains 340(1)-340(M) that are denoted as $g'_1$-$g'_M$, respectively, based on the following equation (6), using values for the integer i of 1-M, respectively.

$$g'_i = \min(g_i, EGL_{VIF}) \quad (6)$$

The tunable VIF extractor 210(1,1) then uses the tuned gains 340(1)-340(M) instead of the gains 332(1)-332(M) to compute the tuned VIF score 220(1,1). The tunable VIF extractor 210(1,1) can compute the tuned VIF score 220(1,1) based on the tuned gains 340(1)-340(M) in any technically feasible fashion. In some embodiments, the tunable VIF extractor 210(1,1) computes the tuned VIF score 220(1,1) based on the following equation (7), where i is an integer from 1 to M.

$$VIF' = \frac{\sum_{i=1}^{M} \log_2\left(1 + \frac{g'^2_i \sigma^2_{p_i}}{\sigma^2_{V_i} + \sigma^2_N}\right)}{\sum_{i=1}^{M} \log_2\left(1 + \frac{\sigma^2_{p_i}}{\sigma^2_N}\right)} \quad (7)$$

Equation (7) is a version of equation (5) in which the gain 332(i) is replaced with the tuned gain 340(i), and VIF is replaced with VIF', where VIF' denotes tuned VIF score 220.

Computing Tuned DLM Scores

Figure 4:
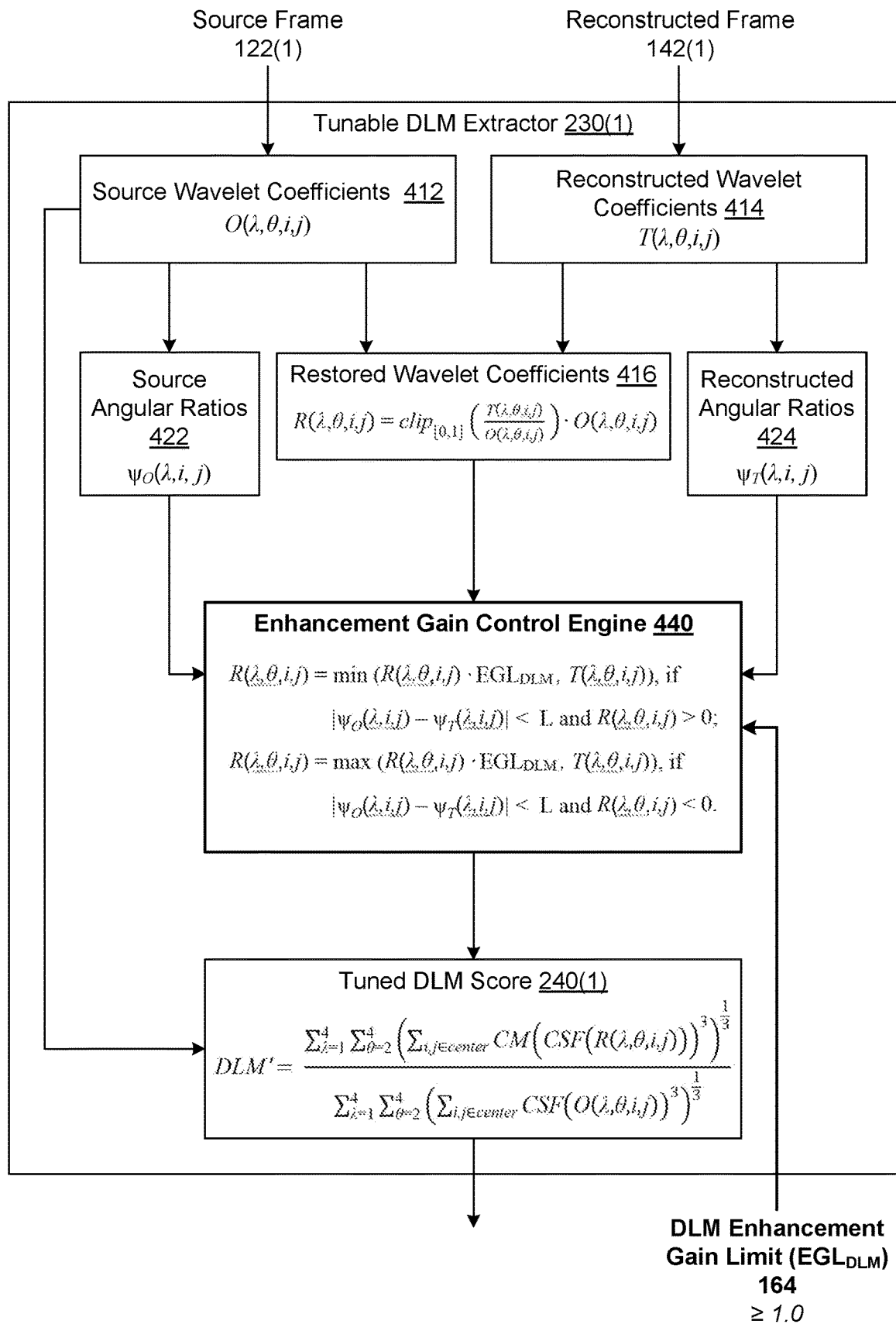
FIG. 4 is a more detailed illustration of one of the tunable detail loss metric ("DLM") extractors of FIG. 2, according to various embodiments.

FIG. 4 is a more detailed illustration of one of the tunable DLM extractors 230 of FIG. 2, according to various embodiments. For explanatory purposes only, the functionality of the tunable DLM extractor 230 is described in FIG. 4 in the context of the tunable DLM extractor 230(1) of FIG. 2. The tunable DLM extractor 230(1) implements the tunable DLM and computes the tuned DLM score 240(1) of the reconstructed frame 142(1).

As described in greater detail below, relative to an increase in a value for the DLM or "DLM score" of the reconstructed frame 142(1) that is attributable to image enhancement operations, the increase in the tuned DLM score 240(1) that is attributable to the image enhancement operations can be reduced. More specifically, the tunable DLM extractor 230(1) limits the impact of image enhancement operations on the tuned DLM score 240(1) based on the DLM enhancement gain limit 164.

As described previously herein in conjunction with FIG. 2, in some embodiments, any number of tunable DLM extractors 230 can be configured to compute the tuned DLM scores 240 of the reconstructed frames 142 based on the techniques described below. In the same or other embodiments, the techniques described herein in conjunction with the tunable DLM extractor 230(1) are applicable to computing the tuned DLM score 240 of any type of distorted signal that is derived from any type of source signal at any scale.

As persons skilled in the art will recognize, the DLM is part of a perceptual image quality metric known as the "additive distortion metric" ("ADM"). The ADM is based on a premise that humans respond differently to the loss of details in a distorted image and additive impairments in the distorted image. The ADM separately evaluates detail losses and additive impairments to compute the DLM score (not shown) and an additive impairment measure ("AIM") score (not shown). The ADM then combines the DLM score and the score to generate an ADM score (not shown).

In some embodiments, the tunable DLM extractor 230(1) implements a version of the DLM that operates in the wavelet domain and is modified based on the DLM enhancement gain limit 164. A version of the DLM that operates in the wavelet domain is also referred to herein as a wavelet-domain implementation of the DLM. In some embodiments, the tunable DLM extractor 230(1) uses 4-scale Daubechies db2 wavelets, where db2 indicates that the number of vanishing moments is 2, to compute source wavelet coefficients 412 and reconstructed wavelet coefficients 414 based on the source frame 122(1) and the reconstructed frame 142(1), respectively. In some other embodiments, the tunable DLM extractor 230(1) can use any type of technical feasible wavelets (e.g., biorthogonal wavelets). For explanatory purposes only, the source wavelet coefficients 412 are referred to herein individually as "the source wavelet coefficient 412." And the reconstructed wavelet coefficients 414 are referred to herein individually as "the reconstructed wavelet coefficient 414."

Based on the source wavelet coefficients 412 and the reconstructed wavelet coefficients 414, the tunable DLM extractor 230(1) decomposes the reconstructed frame 142(1) into a restored image (not shown) and an additive image (not shown). Notably, the reconstructed frame 142(1) is equal to the sum of the restored image and the additive image. The restored image includes the same detail losses as the reconstructed frame 142(1) but does not include any additive impairments. To determine the restored image, the tunable DLM extractor 230(1) can compute restored wavelet coefficients 416 for the restored image in any technically feasible fashion. The restored wavelet coefficients 416 are referred to herein individually as "the restored wavelet coefficient 416."

For explanatory purposes only, $O(\lambda,\theta,i,j)$, $T(\lambda,\theta,i,j)$, $R(\lambda,\theta,i,j)$ denote the source wavelet coefficient 412, the reconstructed wavelet coefficient 414, and the restored wavelet coefficient 416, respectively, for a two-dimensional location (i,j) in a subband having a subband index of 0 of a scale having a scale index of A. The scale index A is a value from 1 to 4, where each of the scale indices 1-4 denotes a different one of the four scales associated with the Daubechies db2 wavelets. The subband index 0 is a value from 1 to 4, where the subband index 1 denotes the approximation subband, the subband index 2 denotes the vertical subband, the subband index 3 denotes the diagonal subband, and the subband index 4 denotes the horizontal subband. Notably, the tunable DLM extractor 230(1) does not use the restored wavelet coefficients 416 for the approximation subbands to compute the tuned DLM score 240(1). Accordingly, in some embodiments, the tunable DLM extractor 230(1) does not compute the restored wavelet coefficients 416 $R(\lambda,1,i,j)$.

As shown, in some embodiments, the tunable DLM extractor 230(1) initially computes the restored wavelet coefficient 416 $R(\lambda,\theta,i,j)$ for each 2-D location in each of the vertical, diagonal, and horizontal subbands having subband indices 2-4, respectively, of each of the four scales based on the following equation (8).

$$R(\lambda, \theta, i, j) = \text{clip}_{[0,1]}\left(\frac{T(\lambda, \theta, i, j)}{O(\lambda, \theta, i, j)}\right) \cdot O(\lambda, \theta, i, j) \qquad (8)$$

Subsequently, if the tunable DLM extractor 230(1) detects contrast enhancement for the reconstructed frame 142(1), then the tunable DLM extractor 230(1) updates any number (including none) of the restored wavelet coefficients 416. The tunable DLM extractor 230(1) can detect contrast enhancement in any technically feasible fashion.

In some embodiments, to detect contrast enhancement, the tunable DLM extractor 230(1) computes source angular ratios 422 and reconstructed angular ratios 424 based on the source wavelet coefficients 412 and the reconstructed wavelet coefficients 414, respectively. Each of the source angular ratios 422 is the angular representation of the ratio between two of the source wavelet coefficients 412 that are co-located in the vertical subband and the horizontal subband of the same scale. The source angular ratios 422 are referred to herein individually as "the source angular ratio 422."

Each of the reconstructed angular ratios 424 is the angular representation of the ratio between two of the reconstructed coefficients 414 that are co-located in the vertical subband and the horizontal subband of the same scale. The reconstructed angular ratios 424 are referred to herein individually as "the reconstructed angular ratio 424."

The tunable DLM extractor 230(1) can compute the source angular ratios 422 and the reconstructed angular ratios 424 in any technically feasible fashion. For explanatory purposes only, $\psi_O(\lambda,i,j)$ and $\psi_T(\lambda,i,j)$ denote the source angular ratio 422 and the reconstructed angular ratio 424, respectively, corresponding to a two-dimensional location (i,j) at a scale having a scale index of $\lambda$.

In some embodiments, for each two-dimensional location at each scale, the tunable DLM extractor 230(1) detects contrast enhancement based on the following equation (9).

$$|\psi_O(\lambda,i,j) - \psi_T(\lambda,i,j)| < L \qquad (9)$$

In equation (9), L denotes a detection threshold that can be any relatively small number. For instance, in some embodiments, the detection threshold is 1.0. In operation, for a given two-dimensional location (i,j) at a given scale $\lambda$, if equation (9) is true, then the tunable DLM extractor 230(1) detects contrast enhancement for the two-dimensional location at the scale. Otherwise, the tunable DLM extractor 230(1) does not detect contrast enhancement for the two-dimensional location at the scale.

For example, in a linear contrast operation, the source frame 122(1) is multiplied by constant value to generate the reconstructed frame 142(1). Because the magnitude of the reconstructed wavelet coefficients 414 are proportionally scaled by 1.5 relative to the magnitudes of the source wavelet coefficients 412, the ratio between the vertical subband and the horizontal subband is unchanged. Consequently, for each two-dimensional location at each scale, the reconstructed angular ratio 424 and the source angular ratio 422 are the same and the tunable DLM extractor 230(1) detects contrast enhancement. As persons skilled in the art will recognize, more complicated image enhancement operations, such as sharpening and histogram equalization, can be considered to be localized linear contrasting operations and can therefore be detected by the tunable DLM extractor 230(1) in a similar fashion.

The tunable DLM extractor 230(1) then updates each restored wavelet coefficient 416 $R(\lambda,\theta,i,j)$ that corresponds to detected contrast enhancement. As referred to herein, the restored wavelet coefficient 416 $R(\lambda,\theta,i,j)$ corresponds to detected contrast enhancement if $|\psi_O(\lambda,i,j) - \psi_T(\lambda,i,j)| < L$. Notably, as per equation (8), none of the restored wavelet coefficients 416 initially exceeds $|O(\lambda,\theta,i,j)|$.

However, in implementations of DLM, each restored wavelet coefficient 416 $R(\lambda,\theta,i,j)$ that corresponds to detected contrast enhancement is set equal to the reconstructed wavelet coefficient 414 $T(\lambda,\theta,i,j)$. As a result, for any number of the restored wavelet coefficients 416 in implementations of the DLM, $|R(\lambda,\theta,i,j)|$ can exceed $|O(\lambda,\theta,i,j)|$. Furthermore, when the restored wavelet coefficient 416 $|R(\lambda,\theta,i,j)|$ exceeds $|O(\lambda,\theta,i,j)|$, the DLM score can exceed one. A DLM score that is greater than one translates into a gain when used to compute a VMAF score via the VMAF model 150.

To limit the enhancement gain that is measurable by the tunable DLM extractor 230(1), the tunable DLM extractor 230(1) limits the increase in the absolute value of each of the restored wavelet coefficients 416 that corresponds to detected contrast enhancement based on the DLM enhancement gain limit 164. The tunable DLM extractor 230(1) can limit the absolute value of each of the restored wavelet coefficients 416 that corresponds to detected contrast enhancement in any technically feasible fashion.

As shown, in some embodiments, an enhancement gain control engine 440 included in the tunable DLM extractor 230(1) limits the absolute value of each of the restored wavelet coefficients 416 that corresponds to detected contrast enhancement based on the DLM enhancement gain limit 164. As shown, the enhancement gain control engine 440 conditionally updates the restored wavelet coefficient 416 $R(\lambda,\theta,i,j)$ for each 2-D location in each of the vertical, diagonal, and horizontal subbands having subband indices 2-4, respectively, of each of the four scales based on the following equations (10a) and (10b).

$$R(\lambda,\theta,i,j) = \min(R(\lambda,\theta,i,j) \cdot EGL_{DLM}, T(\lambda,\theta,i,j)), \text{ if}$$

$$|\psi_O(\lambda,i,j) - \psi_T(\lambda,i,j)| < L \text{ and } R(\lambda,\theta,i,j) > 0; \qquad (10a)$$

$$R(\lambda,\theta,i,j) = \max(R(\lambda,\theta,i,j) \cdot EGL_{DLM}, T(\lambda,\theta,i,j)), \text{ if}$$

$$|\psi_O(\lambda,i,j) - \psi(\lambda,i,j)| < L \text{ and } R(\lambda,\theta,i,j) < 0. \qquad (10b)$$

The tunable DLM extractor 230(1) then computes the tuned DLM score 240(1) based on the source wavelet coefficients 412 and the restored wavelet coefficients 416. The tunable DLM extractor 230(1) can compute the tuned DLM score 240(1) in any technically feasible fashion.

As shown, in some embodiments, tunable DLM extractor 230(1) computes the tuned DLM score 240(1) based on the following equation (11).

$$DLM' = \frac{\sum_{\lambda=1}^{4} \sum_{\theta=2}^{4} \left( \sum_{i,j \in center} CM(CSF(R(\lambda, \theta, i, j)))^3 \right)^{\frac{1}{3}}}{\sum_{\lambda=1}^{4} \sum_{\theta=2}^{4} \left( \sum_{i,j \in center} CSF(O(\lambda, \theta, i, j))^3 \right)^{\frac{1}{3}}} \quad (11)$$

In equation (11), DLM' denotes the tuned DLM score 240(1), CFR denotes a contrast sensitivity function, CM denotes a contrast masking function, and center refers to the center region of each subband with a border factor of 0.1.

In some embodiments, to compute the numerator of equation (11), the tunable DLM extractor 230(1) applies the contrast sensitivity function and the contrast masking function to the restored image via the restored wavelet coefficients 416. The tunable DLM extractor 230(1) performs Minkowski pooling on the resulting coefficients with the power of 3 and summed within the center region of each subband with a border factor of 0.1. The tunable DLM extractor 230(1) sums the results over the vertical, horizontal, and diagonal subbands, and then over the four scales.

In the same or other embodiments, to compute the denominator of equation (11), the tunable DLM extractor 230(1) applies the contrast sensitivity function to the source frame 122(1) via the source wavelet coefficients 412. The tunable DLM extractor 230(1) performs Minkowski pooling on the resulting coefficients with the power of 3 and summed within the center region of each subband with a border factor of 0.1. The tunable DLM extractor 230(1) sums the results over the vertical, horizontal, and diagonal subbands, and then over the four scales.

Notably, as per equations (10a) and (10b), if the DLM enhancement gain limit 164 is equal to 1.0, then for each restored wavelet coefficient 416 $R(\lambda,\theta,i,j)$ corresponding to detected contrast enhancement, the tunable DLM extractor 230(1) ensures that $|R(\lambda,\theta,i,j)|$ does not exceed $|O(\lambda,\theta,i,j)|$. As a result, as per equation (11), the tuned DLM score 240(1) is less than one.

Figure 5:
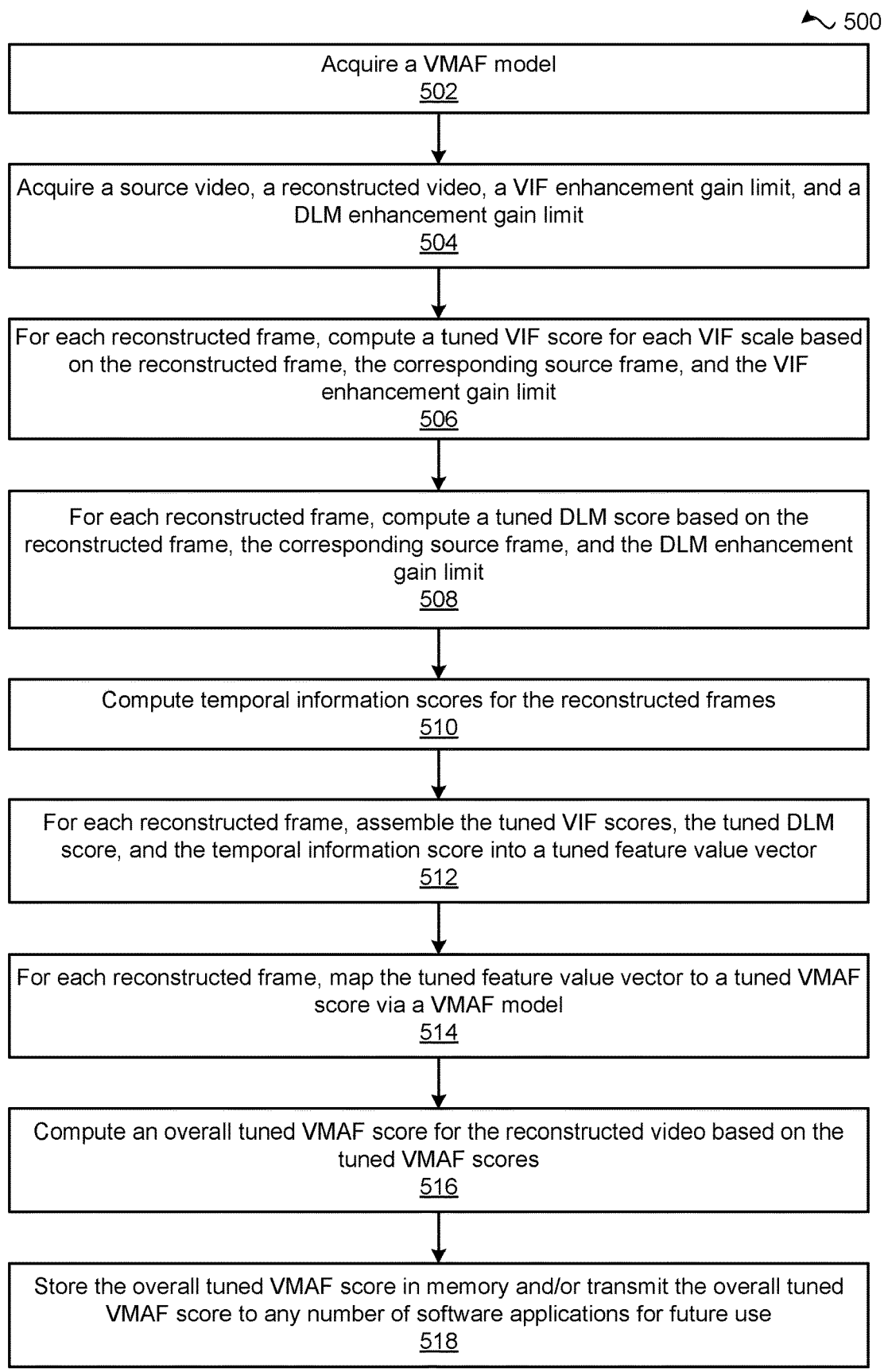
FIG. 5 is a flow diagram of method steps for limiting the influence of image enhancement operations on perceptual video quality estimates for reconstructed video content, according to various embodiments.

FIG. 5 is a flow diagram of method steps for limiting the influence of image enhancement operations on perceptual video quality estimates for reconstructed video content, according to various embodiments. Although the method steps are described with reference to the systems of FIGS. 1-4, persons skilled in the art will understand that any system configured to implement the method steps, in any order, falls within the scope of the embodiments.

As shown, a method 500 begins at step 502, where the tunable VMAF application 160 acquires the VMAF model 150. At step 504, the tunable VMAF application 160 acquires the source video 120, the reconstructed video 140, the VIF enhancement gain limit 162, and the DLM enhancement gain limit 164.

At step 506, for each of the reconstructed frames 142, the tunable VIF extractor 210 computes the tuned VIF score 220 at each of the VIF scales 174 based on the reconstructed frame 142, the source frame 122 that corresponds to the reconstructed frame 142, and the VIF enhancement gain limit 162. At step 508, for each of the reconstructed frames 142, the tunable DLM extractor 230 computes the tuned DLM score 240 based on the reconstructed frame 142, the source frame 122 that corresponds to the reconstructed frame 142, and the DLM enhancement gain limit 164. At step 510, the temporal engine 206 computes the TI scores 250 based on the reconstructed frames 142.

At step 512, for each of the reconstructed frames 142, the assembly engine 278 assembles the tuned VIF scores 220 for the reconstructed frame 142, the tuned DLM score 240 for the reconstructed frame 142, and the TI score 250 for the reconstructed frame 142 into the tuned feature value vector 180 for the reconstructed frame 142. At step 514, for each of the reconstructed frames 142, the tunable VMAF application 160 maps the tuned feature value vector 180 for the reconstructed frame 142 to the tuned VMAF score 158 for the reconstructed frame 142 via the VMAF model 150.

At step 516, the pooling engine 192 computes the overall tuned VMAF score 198 for the reconstructed video 140 based on the tuned VMAF scores 158. At step 518, the tunable VMAF application 160 stores the overall tuned VMAF score 198 in memory and/or transmits the overall tuned VMAF score 198 to any number of software applications for future use. The method 500 then terminates.

In sum, the disclosed techniques can be used to limit the influence of image enhancement operations on estimates of perceptual video quality levels for reconstructed videos. In some embodiments, a tunable VMAF application computes an overall tuned VMAF score for a reconstructed video based on the reconstructed video, a corresponding source video, a tunable feature vector, a VIF enhancement gain limit, and a DLM enhancement gain limit. The tunable feature vector includes, without limitation, four tunable VIF quality indices associated with four different VIF scales, a tunable DLM, and a TI quality metric. The VIF enhancement gain limit is a configurable parameter that limits the enhancement gain measurable by a tunable VIF extractor that institutes the tunable VIF quality index. The DLM enhancement gain limit is a configurable parameter that limits the enhancement gain measurable by a tunable DLM extractor that institutes the tunable DLM.

For each reconstructed frame of the reconstructed video, the tunable VIF extractor computes four tuned VIF scores at the four VIF scales. The tunable VIF extractor computes the tuned VIF score for a given reconstructed frame at a given VIF scale based on the reconstructed frame, the corresponding source frame, the VIF scale, and the VIF enhancement gain limit. In operation, the tunable VIF extractor applies successive Gaussian filtering operations to the source frame and the reconstructed frame based on the VIF scale to generate a filtered source image and a filtered distorted image, respectively. The tunable VIF extractor estimates gains for each pixel in the filtered distorted image based on the filtered source image and the filtered distorted image. For each pixel, the tunable VIF extractor then estimates an additive noise variance based on the associated gain, the filtered source image, and the filtered distorted image. For each pixel, the tunable VIF extractor sets a tuned gain equal to the minimum of the corresponding gain and the VIF enhancement gain limit. The tunable VIF extractor then computes the tuned VIF score based on the tuned gains, the additive noise variances, and the filtered source image.

For each of the reconstructed frames, the tunable DLM extractor computes a tuned DLM score based on the reconstructed frame, the corresponding source frame, and the DLM enhancement gain limit. In operation, the tunable DLM extractor uses 4-scale Daubechies db2 wavelets to compute source wavelet coefficients and reconstructed wavelet coefficients based on the source frame and the reconstructed frame, respectively. Based on the source wavelet coefficients and the reconstructed wavelet coefficients, the tunable DLM extractor computes restored wavelet coefficients for a restored image that includes the same detail loses as the reconstructed frame but does not include any additive impairments. The tunable DLM extractor evaluates the reconstructed frames based on the source wavelet coefficients and the reconstructed wavelet coefficients to detect contrast enhancement. The tunable DLM extractor then updates each of the positive restored wavelet coefficients that corresponds to detected contrast enhancement to the minimum of the corresponding reconstructed wavelet coefficient and the product of the restored wavelet coefficient and the DLM enhancement gain limit. The tunable DLM extractor updates each of the negative restored wavelet coefficients that corresponds to detected contrast enhancement of the maximum of the corresponding reconstructed wavelet coefficient and the product of the restored wavelet coefficient and the DLM enhancement gain limit. The tunable DLM extractor then computes the tuned DLM score based on the source wavelet coefficients and the restored wavelet coefficients.

The tunable VMAF application computes TI scores for the reconstructed frames based on the reconstructed frames. More precisely, to compute the TI score for a given reconstructed frame, the tunable VMAF application sets the TI score equal to the mean co-located pixel difference of the reconstructed frame with respect to a temporally adjacent reconstructed frame. For each of the reconstructed frames, the tunable VMAF application aggregates the tuned VIF scores, the tuned DLM score, and the TI score to generate a tuned feature value vector. For each of the reconstructed frames, the tunable VMAF application maps the tuned feature value vector for the reconstructed frame to a tuned VMAF score for the reconstructed frame via the VMAF model. Based on the tuned VMAF scores, the tunable VMAF application computes an overall tuned VMAF score that estimates the perceptual video quality of the reconstructed video subject to the VIF enhancement gain limit and the DLM enhancement gain limit.

At least one technical advantage of the disclosed techniques relative to the prior art is that the disclosed techniques can be used to reduce the influence of image enhancement operations on perceptual video quality estimations for reconstructed videos. Thus, the disclosed techniques enable the impact of data compression operations on perceptual video quality to be more accurately quantified. In this regard, the disclosed techniques can be applied to reduce the enhancement gains included in feature values on which a given VMAF model is based, which, in turn, reduces the enhancement gains reflected in the perceptual video quality levels estimated by that VMAF model. Thus, with the disclosed techniques, the perceptual video quality levels generated using VMAF models can more accurately reflect the impact of codec data compression operations on perceptual video quality levels. These technical advantages provide one or more technological improvements over prior art approaches.

1. In some embodiments, a computer-implemented method for reducing an amount of influence that image enhancement operations have on perceptual video quality estimates comprises computing a first value for a first visual quality metric based on first reconstructed video content and a first enhancement gain limit, wherein at least one image enhancement operation is used to generate the first reconstructed video content, computing a second value for a second visual quality metric based on the first reconstructed video content and a second enhancement gain limit, generating a first feature value vector based on the first value for the first visual quality metric and the second value for the second visual quality metric, and executing a Video Multi-Method Assessment Fusion ("VMAF") model based on the first feature value vector to generate a first tuned VMAF score that accounts, at least in part, for the at least one image enhancement operation.

2. The computer-implemented method of clause 1, wherein the first tuned VMAF score reduces an impact the at least one image enhancement operation has on a perceptual video quality associated with the first reconstructed video content.

3. The computer-implemented method of clauses 1 or 2, wherein computing the first value for the first visual quality metric comprises applying one or more Gaussian filtering operations to at least a portion of the first reconstructed video content to generate a filtered distorted image, computing a first gain and a first additive noise variance based on the filtered distorted image and a filtered source image, setting a first tuned gain equal to the minimum of the first gain and the first enhancement gain limit, and computing the first value for the first visual quality metric based on of the first tuned gain, the first additive noise variance, and the filtered source image.

4. The computer-implemented method of any of clauses 1-3, wherein the second visual quality metric comprises a modified version of a wavelet-domain implementation of a detail loss metric ("DLM") in which an absolute value of each restored wavelet coefficient for which contrast enhancement is detected is limited based on the second enhancement gain limit.

5. The computer-implemented method of any of clauses 1-4, wherein the first value for the first visual quality metric is associated with a first spatial scale, and wherein generating the first feature value vector comprises computing at least a third value for the first visual quality metric based on the first reconstructed video content, the first enhancement gain limit, and at least a second spatial scale, and aggregating at least the first value for the first visual quality metric, the at least the third value for the first visual quality metric, and the second value for the second visual quality metric.

6. The computer-implemented method of any of clauses 1-5, wherein the first reconstructed video content comprises a first frame included in a reconstructed video, and further comprising computing an overall tuned VMAF score associated with the reconstructed video based on the first tuned VMAF score and at least a second tuned VMAF score associated with a second frame included in the reconstructed video.

7. The computer-implemented method of any of clauses 1-6, wherein at least one data compression operation is used to generate the first reconstructed video content, and further comprising estimating an amount of influence the at least one data compression operation has on a perceptual video quality of the first reconstructed video content based on the first tuned VMAF score.

8. The computer-implemented method of any of clauses 1-7, wherein the at least one image enhancement operation comprises at least one of a sharpening operation, a contrasting operation, or a histogram equalization operation.

9. The computer-implemented method of any of clauses 1-8, further comprising generating the first reconstructed video content using a coder/decoder ("codec") that executes a first image enhancement operation either prior to executing at least one data compression operation or subsequent to executing at least one data decompression operation.

10. The computer-implemented method of any of clauses 1-9, wherein the VMAF model implements at least one of a support vector regression algorithm, an artificial neural network algorithm, or a random forest algorithm that is trained based on a plurality of human-observed visual quality scores for reconstructed training video content.

11. In some embodiments, one or more non-transitory computer readable media include instructions that, when executed by one or more processors, cause the one or more processors to reduce an amount of influence that image enhancement operations have on perceptual video quality estimates by performing the steps of computing a plurality of values for a plurality of visual quality metrics based on first reconstructed video content and at least one enhancement gain limit, wherein at least one image enhancement operation is used to generate the first reconstructed video content, generating a first feature value vector based on the plurality of values for the plurality of visual quality metrics, and executing a Video Multi-Method Assessment Fusion ("VMAF") model based on the first feature value vector to generate a first tuned VMAF score that accounts, at least in part, for the at least one image enhancement operation.

12. The one or more non-transitory computer readable media of clause 11, wherein the first tuned VMAF score reduces an impact the at least one image enhancement operation has on a perceptual video quality associated with the first reconstructed video content.

13. The one or more non-transitory computer readable media of clauses 11 or 12, wherein a first visual quality metric included in the plurality of visual quality metrics comprises a modified version of a pixel-domain implementation of a Visual Information Fidelity ("VIF") quality index in which each gain included in a plurality of gains is limited to a maximum of a VIF enhancement gain limit.

14. The one or more non-transitory computer readable media of any of clauses 11-13, wherein a first visual quality metric included in the plurality of visual quality metrics comprises a modified version of a wavelet-domain implementation of a detail loss metric ("DLM") in which an absolute value of each restored wavelet coefficient for which contrast enhancement is detected is limited based on a DLM enhancement gain limit.

15. The one or more non-transitory computer readable media of any of clauses 11-14, wherein generating the first feature value vector comprises computing a first value for a temporal quality metric based on the first reconstructed video content, and aggregating at least the plurality of values for the plurality of visual quality metrics and the first value for the temporal quality metric.

16. The one or more non-transitory computer readable media of any of clauses 11-15, wherein the first reconstructed video content comprises a first frame included in a reconstructed video, and further comprising performing one or more temporal pooling operations on a plurality of tuned VMAF scores that includes the first tuned VMAF score and is associated with a plurality of frames included in the reconstructed video to determine an overall tuned VMAF score associated with the reconstructed video.

17. The one or more non-transitory computer readable media of any of clauses 11-16, wherein at least one data compression operation is used to generate the first reconstructed video content, and further comprising estimating an amount of influence the at least one data compression operation has on a perceptual video quality of the first reconstructed video content based on the first tuned VMAF score.

18. The one or more non-transitory computer readable media of any of clauses 11-17, wherein the at least one image enhancement operation comprises at least one of a sharpening operation, a contrasting operation, or a histogram equalization operation.

19. The one or more non-transitory computer readable media of any of clauses 11-18, wherein the VMAF model implements at least one of a support vector regression algorithm, an artificial neural network algorithm, or a random forest algorithm that is trained based on a plurality of human-observed visual quality scores for reconstructed training video content.

20. In some embodiments, a system comprises one or more memories storing instructions and one or more processors coupled to the one or more memories that, when executing the instructions, perform the steps of computing a first feature value for a first feature included in a feature vector based on first reconstructed video content and a first enhancement gain limit, wherein at least one image enhancement operation is used to generate the first reconstructed video content, computing a second feature value for a second feature included in the feature vector based on the first reconstructed video content and a second enhancement gain limit, generating a first feature value vector for the feature vector based on the first feature value and the second feature value, and executing a Video Multi-Method Assessment Fusion ("VMAF") model based on the first feature value vector to generate a first tuned VMAF score that accounts, at least in part, for the at least one image enhancement operation.

Any and all combinations of any of the claim elements recited in any of the claims and/or any elements described in this application, in any fashion, fall within the contemplated scope of the embodiments and protection.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure can take the form of a computer program product embodied in one or more computer readable media having computer readable program codec embodied thereon.

Any combination of one or more computer readable media can be utilized. Each computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory, a read-only memory, an erasable programmable read-only memory, a Flash memory, an optical fiber, a portable compact disc read-only memory, an optical storage device, a magnetic storage device, or any suitable combination of the foregoing. In the context of this document, a computer readable storage medium can be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
computing a first value for a first visual quality metric for first reconstructed video content;
computing a second value for a second visual quality metric for the first reconstructed video content;
generating a first feature value vector based on the first value and the second value; and
generating, based on the first feature value vector, a score that accounts for, at least in part, a first image enhancement operation used to generate the first reconstructed video content.

2. The computer-implemented method of claim 1, wherein computing the first value for the first visual quality metric is based on a first enhancement gain limit.

3. The computer-implemented method of claim 1, wherein computing the second value for the second visual quality metric is based on a second enhancement gain limit.

4. The computer-implemented method of claim 1, wherein generating the score comprises executing a trained model based on the first feature value vector.

5. The computer-implemented method of claim 4, wherein the trained model implements at least one of a support vector regression algorithm, an artificial neural network algorithm, or a random forest algorithm that is trained based on a plurality of human-observed visual quality scores for reconstructed training video content.

6. The computer-implemented method of claim 1, wherein the score reduces how much impact the first image enhancement operation has on a perceptual video quality associated with the first reconstructed video content.

7. The computer-implemented method of claim 1, wherein the second visual quality metric comprises a modified version of a wavelet-domain implementation of a detail loss metric ("DLM").

8. The computer-implemented method of claim 1, wherein the first value for the first visual quality metric is associated with a first spatial scale.

9. The computer-implemented method of claim 1, wherein the first value for the first visual quality metric is computed based on the first reconstructed video content that comprises a first frame included in a reconstructed video, and further comprising computing an overall score for the reconstructed video based on the score and at least a second score for a second frame included in the reconstructed video.

10. The computer-implemented method of claim 1, wherein the first image enhancement operation comprises a sharpening operation, a contrasting operation, or a histogram equalization operation.

11. The computer-implemented method of claim 1, further comprising generating the first reconstructed video content using a coder/decoder ("codec") that executes the first image enhancement operation.

12. One or more non-transitory computer-readable media including instructions that, when executed by one or more processors, cause the one or more processors to perform the steps of:
generating a first feature value vector based on a first value for a first visual quality metric for first reconstructed video content and a second value for a second visual quality metric for the first reconstructed video content; and
generating, based on the first feature value vector, a first score that accounts for, at least in part, a first image enhancement operation used to generate the first reconstructed video content.

13. The one or more non-transitory computer-readable media of claim 12, further comprising computing the first value for the first visual quality metric based on a first enhancement gain limit.

14. The one or more non-transitory computer-readable media of claim 12, wherein the first image enhancement operation comprises a sharpening operation, a contrasting operation, or a histogram equalization operation.

15. The one or more non-transitory computer-readable media of claim 12, further comprising computing the second value for the second visual quality metric based on a second enhancement gain limit.

16. The one or more non-transitory computer-readable media of claim 12, wherein the first visual quality metric comprises a modified version of a pixel-domain implementation of a Visual Information Fidelity ("VIF") quality index.

17. The one or more non-transitory computer-readable media of claim 12, wherein the first reconstructed video content comprises a first frame included in a reconstructed video, and further comprising performing one or more temporal pooling operations on a plurality of scores that includes the first score and are for a plurality of frames included in the reconstructed video to determine an overall score for the reconstructed video.

18. The one or more non-transitory computer-readable media of claim 12, wherein generating the first score comprises executing a trained model based on the first feature value vector.

19. The one or more non-transitory computer-readable media of claim 18, wherein the trained model implements at least one of a support vector regression algorithm, an artificial neural network algorithm, or a random forest algorithm that is trained based on a plurality of human-observed visual quality scores for reconstructed training video content.

20. The one or more non-transitory computer-readable media of claim 12, further comprising generating the first reconstructed video content using a coder/decoder ("codec") that executes the first image enhancement operation.

21. A system comprising:
one or more memories storing instructions; and
one or more processors coupled to the one or more memories that, when executing the instructions, perform the steps of:
generating a first feature value vector based on at least a first value of a first visual quality metric for first reconstructed video content and a second value for a second visual quality metric for the first reconstructed video content; and
generating, based on the first feature value vector, a score that accounts for, at least in part, a first image enhancement operation used to generate the first reconstructed video content.

22. A computer-implemented method for reducing the impact that image enhancement operations have on perceptual video quality estimates, the method comprising:
computing a first value for a first visual quality metric based on first reconstructed video content and a first enhancement gain limit, wherein a first image enhancement operation is used to generate the first reconstructed video content;
computing a second value for a second visual quality metric based on the first reconstructed video content and a second enhancement gain limit;
generating a first feature value vector based on the first value and the second value; and
generating, based on the first feature value vector, a first score that accounts for, at least in part, the first image enhancement operation.

23. The computer-implemented method of claim 22, wherein the first score comprises a first tuned Video Multi-Method Assessment Fusion (VMAF) score.

24. The computer-implemented method of claim 22, wherein generating the first score comprises executing a trained model based on the first feature value vector.

25. The computer-implemented method of claim 24, wherein the trained model implements at least one of a support vector regression algorithm, an artificial neural network algorithm, or a random forest algorithm that is trained based on a plurality of human-observed visual quality scores for reconstructed training video content.

26. The computer-implemented method of claim 22, wherein the first reconstructed video content comprises a first frame included in a reconstructed video, and further comprising computing an overall score for the reconstructed video based on the first score and at least a second score for a second frame included in the reconstructed video.

27. The computer-implemented method of claim 22, wherein the first image enhancement operation comprises a sharpening operation, a contrasting operation, or a histogram equalization operation.

* * * * *